United States Patent
Yu et al.

(10) Patent No.: US 12,506,533 B2
(45) Date of Patent: Dec. 23, 2025

(54) COMMUNICATION METHOD AND APPARATUS

(71) Applicant: HUAWEI TECHNOLOGIES CO., LTD., Guangdong (CN)

(72) Inventors: Haifeng Yu, Beijing (CN); Xun Tang, Shenzhen (CN); Bingzhao Li, Beijing (CN); Lei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/863,668

(22) Filed: Jul. 13, 2022

(65) Prior Publication Data
US 2022/0361251 A1    Nov. 10, 2022

Related U.S. Application Data

(63) Continuation of application No. PCT/CN2020/072082, filed on Jan. 14, 2020.

(51) Int. Cl.
*H04W 74/08* (2024.01)
*H04B 7/185* (2006.01)
*H04W 56/00* (2009.01)
*H04W 74/0833* (2024.01)

(52) U.S. Cl.
CPC .... *H04B 7/18513* (2013.01); *H04W 56/0045* (2013.01); *H04W 74/0833* (2013.01)

(58) Field of Classification Search
CPC .......... H04W 74/0833; H04W 56/0045; H04B 7/18513; H04B 7/1853; Y02D 30/70
See application file for complete search history.

(56) References Cited

U.S. PATENT DOCUMENTS

| | | | |
|---|---|---|---|
| 2012/0127964 A1* | 5/2012 | Turtinen | H04W 56/0045 370/336 |
| 2013/0100938 A1* | 4/2013 | Kwon | H04L 27/2655 370/336 |
| 2013/0244640 A1* | 9/2013 | Viorel | H04W 56/0045 455/422.1 |
| 2017/0359790 A1* | 12/2017 | Wang | H04J 11/005 |
| 2020/0153500 A1* | 5/2020 | Kim | H04B 17/318 |
| 2021/0029658 A1* | 1/2021 | Mahalingam | H04W 74/0833 |
| 2021/0075501 A1* | 3/2021 | Xu | H04B 7/1853 |

(Continued)

FOREIGN PATENT DOCUMENTS

| CN | 107197517 A | 9/2017 |
|---|---|---|
| CN | 109874168 A | 6/2019 |

(Continued)

OTHER PUBLICATIONS

Extended European Search Report in European Appln No. 20913253.9, dated Dec. 12, 2022, 10 pages.

(Continued)

*Primary Examiner* — Rasheed Gidado
(74) *Attorney, Agent, or Firm* — Fish & Richardson P.C.

(57) ABSTRACT

The present disclosure relates to communication methods and apparatus, which are particularly applied to a non-terrestrial network. In one example method, a terminal device determines a first duration, and determines a timing advance amount based on the first duration, where the timing advance amount is used for communication between the terminal device and a network device.

21 Claims, 9 Drawing Sheets

(56) References Cited

U.S. PATENT DOCUMENTS

2021/0168871 A1* 6/2021 Lee ................ H04L 7/0033
2022/0104277 A1* 3/2022 Narasimha ............ H04W 76/19

FOREIGN PATENT DOCUMENTS

| | | |
|---|---|---|
| CN | 110062455 A | 7/2019 |
| CN | 110446254 A | 11/2019 |
| WO | 2019161044 A1 | 8/2019 |
| WO | 2019195457 A1 | 10/2019 |

OTHER PUBLICATIONS

3GPP TS 38.321 V15.8.0 (Dec. 2019), "3rd Generation Partnership Project; Technical Specification Group Radio Access Network; NR; Medium Access Control (MAC) protocol specification (Release 15)," Dec. 2019, 78 pages.

3GPP TS 38.331 V15.8.0 (Dec. 2019), 3rd Generation Partnership Project; Technical Specification Group Radio Access Network; NR; Radio Resource Control (RRC) protocol specification (Release 15), Dec. 2019, 532 pages.

3GPP TR 38.821 V1.0.0 (Decc. 2019), "3rd Generation Partnership Project; Technical Specification Group Radio Access Network; Solutions for NR to support non-terrestrial networks (NTN) (Release 16)," Dec. 2019, 143 pages.

PCT International Search Report and Written Opinion issued in International Application No. PCT/CN2020/072082 on Oct. 13, 2020, 17 pages (with English translation).

Ericsson, "TP on remaining details on Random access for NTN," 3GPP TSG-RAN WG2#108, R2-1916414, Nov. 18-22, 2019, 3 pages.

CATT, "PRACH design and UL timing management," 3GPP TSG RAN WG1 Meeting#99, R1-1912165, Nov. 18-22, 2019, 5 pages.

Catt et al., "TP on Random Access procedure," 3GPP TSG RAN WG2 Meeting#108, R2-1916505, Reno, USA, Nov. 18-22, 2019, 3 pages.

Huawei et al., "Discussion on Doppler compensation, timing advance and RACH for NTN," 3GPP TSG RAN WG1 Meeting #98bis, R1-1910064, Chongqing, China, Oct. 14-20, 2019, 8 pages.

Communication pursuant to Article 94(3) EPC in European Appln. No. 20913253.9, mailed on Oct. 23, 2025, 12 pages.

* cited by examiner

COMMUNICATION METHOD AND APPARATUS

CROSS-REFERENCE TO RELATED APPLICATIONS

This application is a continuation of International Application No. PCT/CN2020/072082, filed on Jan. 14, 2020, the disclosure of which is hereby incorporated by reference in its entirety.

TECHNICAL FIELD

This application relates to the field of wireless communication technologies, and in particular, to a communication method and apparatus.

BACKGROUND

In a fifth generation (fifth generation, 5G) communication system, a non-terrestrial network (non-terrestrial Network, NTN) is introduced. The non-terrestrial network is a communication network in which a device such as an aircraft or a satellite is introduced into the communication system to serve as a relay node or a base station.

In the non-terrestrial network, because the device such as the aircraft or the satellite participates in a communication process, a propagation distance between a terminal device and a base station is long. For example, a terminal device sends data to a base station. The data needs to be transmitted to a satellite relay node, and then the satellite relay node transmits the data to the base station, or the data needs to be transmitted to a satellite serving as a base station. A propagation distance in this solution is longer than that in a conventional public land mobile network, and a round-trip time (round-trip time) of data transmission may reach tens of milliseconds to hundreds of milliseconds.

Because a timing advance amount of the terminal device is related to the round-trip time of data transmission, for the non-terrestrial network, how the terminal device obtains the timing advance amount still needs to be further studied currently.

SUMMARY

This application provides a communication method and apparatus, to resolve a problem of how a terminal device obtains a timing advance amount in an NTN scenario.

According to a first aspect, an embodiment of this application provides a communication method. The method may be applied to a terminal device, or may be applied to a chip in a terminal device. For example, the method is applied to a terminal device. In this method, if the terminal device determines that a first duration needs to be obtained, the terminal device may determine the first duration, and determine a timing advance TA amount based on the first duration, where the timing advance amount is used for communication between the terminal device and a network device.

According to the foregoing method, the terminal device can determine the first duration based on a requirement of the terminal device, so that power consumption of the terminal device can be reduced.

In a possible design, if the terminal device determines to trigger a random access procedure, the terminal device determines that the first duration needs to be obtained.

In a possible design, the determining that a first duration needs to be obtained includes: determining that the terminal device does not have a valid first duration, or determining that the terminal device does not have an available first duration.

In a possible design, a trigger reason of the random access procedure does not include requesting a system message or beam failure recovery.

In a possible design, the determining the first duration includes: receiving a system message from the network device, where the system message is used to carry the first duration.

According to the foregoing method, the terminal device reads the system message when determining that the first duration needs to be obtained. In other words, that the terminal device reads the system message is not limited by an existing system message changing mechanism. Therefore, it can be ensured that the terminal device obtains the first duration, and the terminal device can also be effectively prevented from frequently reading the system message, to reduce the power consumption of the terminal device.

In a possible design, the determining the first duration includes: determining the first duration based on a first auxiliary parameter, where the first auxiliary parameter includes location information of a ground reference point, or the first auxiliary parameter includes location information of a ground reference point and location information of the network device; or determining the first duration based on a second auxiliary parameter, where the second auxiliary parameter includes an initial value of the first duration, information about a moment corresponding to the initial value, and a change rate of the first duration.

In a possible design, the method further includes: receiving the first auxiliary parameter and/or the second auxiliary parameter from the network device.

In a possible design, the first duration is determined based on the first auxiliary parameter and a satellite ephemeris, and the satellite ephemeris is from the network device or a core network device, or the satellite ephemeris is preconfigured, where the network device is located on a satellite, or the satellite is a relay node for communication between the terminal device and the network device.

In a possible design, the determining a timing advance amount based on the first duration includes: obtaining a second duration, and determining the timing advance amount based on the first duration and the second duration.

In a possible design, the obtaining a second duration includes: receiving a random access response from the network device, where the random access response includes the second duration.

In a possible design, the obtaining a second duration includes: receiving a random access response from the network device, where the random access response includes a fourth duration; and receiving an adjustment value of the fourth duration from the network device, and determining the second duration based on the fourth duration and the adjustment value.

According to the foregoing method, accuracy of the second duration can be effectively ensured. In addition, because the network device can send the adjustment value to the terminal device without resending the second duration, transmission resources can be effectively saved.

According to a second aspect, an embodiment of this application provides a communication method. The method may be applied to a terminal device, or may be applied to a chip in a terminal device. For example, the method is applied to a terminal device. In this method, the terminal device receives a first auxiliary parameter from a network device, where the first auxiliary parameter includes a location of aground reference point, or the first auxiliary parameter includes a location of a ground reference point and a location of the network device; and the terminal device determines a first duration based on the first auxiliary parameter, where the first duration is used to determine a timing advance amount, and the timing advance amount is used for communication between the terminal device and the network device.

According to this solution, the terminal device may determine the first duration based on the first auxiliary parameter, so that the terminal device can be effectively prevented from frequently reading a system message, to reduce power consumption of the terminal device.

In a possible design, the first duration is determined based on the first auxiliary parameter and a satellite ephemeris; and the method further includes: obtaining the satellite ephemeris, where the network device is located on a satellite, or the satellite is a relay node for communication between the terminal device and the network device.

In a possible design, the obtaining the satellite ephemeris includes: receiving the satellite ephemeris from the network device or a core network device.

In a possible design, the first auxiliary parameter is carried in a system message from the network device.

In a possible design, before the determining the first duration based on the first auxiliary parameter, the method further includes: determining that the first duration needs to be obtained.

In a possible design, the determining that the first duration needs to be obtained includes: determining to trigger a random access procedure.

In a possible design, the determining that the first duration needs to be obtained includes: determining that the terminal device does not have a valid first duration.

According to a third aspect, an embodiment of this application provides a communication method. The method may be applied to a terminal device, or may be applied to a chip in a terminal device. For example, the method is applied to a terminal device. In this method, the terminal device receives a second auxiliary parameter from a network device, where the second auxiliary parameter includes an initial value of a first duration, information about a moment corresponding to the initial value, and a change rate of the first duration; and the terminal device determines the first duration based on the second auxiliary parameter, where the first duration is used to determine a timing advance amount, and the timing advance amount is used for communication between the terminal device and the network device.

According to this solution, the terminal device may determine the first duration based on the second auxiliary parameter, so that the terminal device can be effectively prevented from frequently reading a system message, to reduce power consumption of the terminal device.

In a possible design, the receiving a second auxiliary parameter from a network device includes: receiving a system message from the network device, where the system message includes the second auxiliary parameter.

In a possible design, before the determining the first duration based on the second auxiliary parameter, the method further includes: determining that the first duration needs to be obtained.

In a possible design, the determining that the first duration needs to be obtained includes: determining that a random access procedure is triggered.

In a possible design, the determining that the first duration needs to be obtained includes: determining that the terminal device does not have a valid first duration.

According to a fourth aspect, an embodiment of this application provides a communication method. The method may be applied to a terminal device, or may be applied to a chip in a terminal device. For example, the method is applied to a terminal device. In this method, the terminal device determines a first change periodicity of a first system message, where the first system message is used to carry a first duration, the first duration is used to determine a first timing advance amount, and the first timing advance amount is used for communication between the terminal device and a first network device; and the terminal device receives the first system message from the first network device based on the first change periodicity, where the first change periodicity is different from a second change periodicity of a second system message, and the second system message is from the first network device.

According to the foregoing method, a new change periodicity is designed for the first system message, so that the terminal device can read the first system message based on the change periodicity of the first system message, and does not need to read a system message other than the first system message. Therefore, the terminal device can be effectively prevented from reading an unnecessary system message, and power consumption of the terminal device can be reduced.

In a possible design, the first change periodicity is shorter than the second change periodicity.

Because the first change periodicity is short, it can be effectively ensured that the terminal device obtains the first system message in time.

In a possible design, the receiving the first system message from the first network device based on the first change periodicity includes: receiving the first system message from the first network device in each first change periodicity.

In a possible design, the receiving the first system message from the first network device based on the first change periodicity includes: receiving first indication information from the first network device, where the first indication information is used to indicate that the first system message changes; and receiving an updated first system message in the first change periodicity in which the first indication information is located.

According to the foregoing method, the terminal device can read the first system message based on the first indication information when the first system message changes, so that the terminal device can be effectively prevented from frequently reading the first system message, to further reduce power consumption of the terminal device.

In a possible design, the first system message is further used to carry a third duration, the third duration is used to determine a second timing advance amount, and the second timing advance amount is used for communication between the terminal device and a second network device.

In a possible design, the receiving the first system message from the first network device based on the first change periodicity includes: receiving second indication information from the first network device, where the second indication information is used to indicate that the first duration changes, or is used to indicate that the third duration changes; and receiving the first system message in the first change periodicity in which the second indication information is located.

According to the foregoing method, the second indication information can clearly indicate that the second duration and/or the third duration change/changes, so that the terminal device can learn of a changed duration, read the changed duration, and no longer read an unchanged duration, thereby effectively reducing power consumption of the terminal device.

In a possible design, the first network device is a serving network device of the terminal device, and the second network device is a candidate serving network device of the terminal device.

According to a fifth aspect, an embodiment of this application provides a communication method. The method may be applied to a terminal device, or may be applied to a chip in a terminal device. For example, the method is applied to a terminal device. In this method, the terminal device receives a first duration from a source network device, and determines a timing advance amount based on the first duration, where the timing advance amount is used for communication between the terminal device and a target network device.

According to the foregoing method, the terminal device obtains, by using the source network device, the first duration corresponding to the target network device, so that the terminal device does not need to read a system message of the target network device to obtain the first duration, thereby effectively reducing power consumption of the terminal device.

In a possible design, the first duration is carried in an RRC reconfiguration message from the source network device.

In a possible design, the determining a timing advance amount based on the first duration includes: obtaining a second duration, and determining the timing advance amount based on the first duration and the second duration.

In a possible design, the obtaining a second duration includes: receiving a random access response from the target network device, where the random access response includes the second duration; or receiving a random access response from the target network device, where the random access response includes a fourth duration; and receiving an adjustment value of the fourth duration from the target network device, and determining the second duration based on the fourth duration and the adjustment value.

According to a sixth aspect, an embodiment of this application provides a communication method. The method may be applied to a terminal device, or may be applied to a chip in a terminal device. For example, the method is applied to a terminal device. In this method, the terminal device receives downlink control information from a network device, where the downlink control information is used to indicate the terminal device to trigger a random access procedure, and the downlink control information includes a first duration; and the terminal device determines a timing advance amount based on the first duration, where the timing advance amount is used for communication between the terminal device and the network device.

According to the foregoing method, the terminal device obtains the first duration by using a PDCCH order, so that the terminal device does not need to read a system message of the network device to obtain the first duration, thereby effectively reducing power consumption of the terminal device.

In a possible design, the determining a timing advance amount based on the first duration includes: obtaining a second duration, and determining the timing advance amount based on the first duration and the second duration.

In a possible design, the obtaining a second duration includes: receiving a random access response from a target network device, where the random access response includes the second duration; or receiving a random access response from a target network device, where the random access response includes a fourth duration; and receiving an adjustment value of the fourth duration from the target network device, and determining the second duration based on the fourth duration and the adjustment value.

According to a seventh aspect, an embodiment of this application provides a communication method. The method may be applied to a network device, or may be applied to a chip in a network device. For example, the method is applied to a network device. In this method, the network device determines an auxiliary parameter, where the auxiliary parameter includes a location of a ground reference point, or the auxiliary parameter includes a location of a ground reference point and a location of the network device, or the auxiliary parameter includes an initial value of a first duration, information about a moment corresponding to the initial value, and a change rate of the first duration; and sends the auxiliary parameter to a terminal device.

In a possible design, the sending the auxiliary parameter to a terminal device includes: sending a system message to the terminal device, where the auxiliary parameter is carried in the system message.

In a possible design, the method further includes: sending a satellite ephemeris to the terminal device, where the network device is located on a satellite, or the satellite is a relay node for communication between the terminal device and the network device.

According to an eighth aspect, an embodiment of this application provides a communication method. The method may be applied to a network device, or may be applied to a chip in a network device. For example, the method is applied to a first network device. In this method, the first network device determines a first change periodicity of a first system message, where the first system message is used to carry a first duration, the first duration is used to determine a first timing advance amount, and the first timing advance amount is used for communication between a terminal device and the first network device; and sends third indication information to the terminal device, where the third indication information is used to indicate the first change periodicity, the first change periodicity is different from a second change periodicity of a second system message, and the second system message is from the first network device.

In a possible design, the method further includes: sending first indication information to the terminal device, where the first indication information is used to indicate that the first system message changes.

In a possible design, the first system message is further used to carry a third duration, the third duration is used to determine a second timing advance amount, and the second timing advance amount is used for communication between the terminal device and a second network device.

In a possible design, the method further includes: sending second indication information to the terminal device, where the second indication information is used to indicate that the first duration changes, or is used to indicate that the third duration changes.

According to a ninth aspect, an embodiment of this application provides a communication method. The method may be applied to a network device, or may be applied to a chip in a network device. For example, the method is applied to a source network device. In this method, the source network device receives a first duration from a target network device, where the first duration is used to determine a timing advance amount, and the timing advance amount is used for communication between a terminal device and the target network device; and sends the first duration to the terminal device.

In a possible design, the receiving a first duration from a target network device includes: sending a handover request to the target network device, and receiving a handover response from the target network device, where the handover response includes the first duration.

In a possible design, the sending the first duration to the terminal device includes: sending an RRC reconfiguration message to the terminal device, where the RRC reconfiguration message includes the first duration.

According to a tenth aspect, an embodiment of this application provides a communication method. The method may be applied to a network device, or may be applied to a chip in a network device. For example, the method is applied to a target network device. In this method, the target network device determines a first duration, where the first duration is used to determine a timing advance amount, and the timing advance amount is used for communication between a terminal device and the target network device; and sends the first duration to a source network device.

In a possible design, the sending the first duration to a source network device includes: receiving a handover request from the source network device, and sending a handover response to the source network device, where the handover response includes the first duration.

According to an eleventh aspect, an embodiment of this application provides a communication method. The method may be applied to a network device, or may be applied to a chip in a network device. For example, the method is applied to a network device. In this method, the network device determines a first duration, where the first duration is used to determine a timing advance amount, and the timing advance amount is used for communication between a terminal device and the target network device; and sends downlink control information to the terminal device, where the downlink control information is used to indicate the terminal device to trigger a random access procedure, and the downlink control information includes the first duration.

It should be noted that, because the communication methods described in the seventh aspect to the eleventh aspect correspond to the communication methods described in the first aspect to the sixth aspect, for related beneficial effects of the communication methods described in the seventh aspect to the eleventh aspect, refer to the first aspect to the sixth aspect. Further, in the first aspect to the eleventh aspect, beneficial effects of same or corresponding features may refer to each other.

According to a twelfth aspect, this application provides a communication apparatus. The communication apparatus may be a terminal device or a chip disposed in a terminal device. The communication apparatus has a function of implementing the first aspect to the sixth aspect. For example, the communication apparatus includes a corresponding module, unit, or means (means) for performing steps in the first aspect to the sixth aspect. The function, unit or means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive a system message from a network device. The processing unit may be configured to perform some internal operations of the communication apparatus. Functions performed by the processing unit and the communication unit may correspond to the steps in the first aspect to the sixth aspect.

In a possible design, the communication apparatus includes a processor, and may further include a transceiver. The transceiver is configured to receive and send a signal, and the processor executes program instructions to complete the method in any possible design or implementation of the first aspect to the sixth aspect. The communication apparatus may further include one or more memories. The memory is configured to be coupled to the processor. The one or more memories may be integrated with the processor, or may be disposed independent of the processor. This is not limited in this application. The memory may store a computer program or instructions necessary for implementing the functions in the first aspect to the sixth aspect. The processor may execute the computer program or instructions stored in the memory. When the computer program is executed or the instructions are executed, the communication apparatus is enabled to implement the method in any possible design or implementation of the first aspect to the sixth aspect.

In a possible design, the communication apparatus includes a processor and a memory. The memory may store a computer program or instructions necessary for implementing the functions in the first aspect to the sixth aspect. The processor may execute the computer program or instructions stored in the memory. When the computer program is executed or the instructions are executed, the communication apparatus is enabled to implement the method in any possible design or implementation of the first aspect to the sixth aspect.

In a possible design, the communication apparatus includes at least one processor and an interface circuit. The at least one processor is configured to: communicate with another apparatus through the interface circuit, and perform the method in any possible design or implementation of the first aspect to the sixth aspect.

According to a thirteenth aspect, this application provides a communication apparatus. The communication apparatus may be a network device or a chip disposed in a network device. The communication apparatus has a function of implementing the seventh aspect to the eleventh aspect. For example, the communication apparatus includes a corresponding module, unit, or means for performing steps in the seventh aspect to the eleventh aspect. The function, unit or means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to send a system message to a terminal device. The processing unit may be configured to perform some internal operations of the communication apparatus. Functions performed by the processing unit and the communication unit may correspond to the steps in the seventh aspect to the eleventh aspect.

In a possible design, the communication apparatus includes a processor, and may further include a transceiver. The transceiver is configured to receive and send a signal, and the processor executes program instructions to complete the method in any possible design or implementation of the seventh aspect to the eleventh aspect. The communication apparatus may further include one or more memories. The memory is configured to be coupled to the processor. The one or more memories may be integrated with the processor, or may be disposed independent of the processor. This is not limited in this application. The memory may store a computer program or instructions necessary for implementing the functions in the seventh aspect to the eleventh aspect. The processor may execute the computer program or instructions stored in the memory. When the computer program is executed or the instructions are executed, the communication apparatus is enabled to implement the method in any possible design or implementation of the seventh aspect to the eleventh aspect.

In a possible design, the communication apparatus includes a processor and a memory. The memory may store a computer program or instructions necessary for implementing the functions in the seventh aspect to the eleventh aspect. The processor may execute the computer program or instructions stored in the memory. When the computer program is executed or the instructions are executed, the communication apparatus is enabled to implement the method in any possible design or implementation of the seventh aspect to the eleventh aspect.

In a possible design, the communication apparatus includes at least one processor and an interface circuit. The at least one processor is configured to: communicate with another apparatus through the interface circuit, and perform the method in any possible design or implementation of the seventh aspect to the eleventh aspect.

According to a fourteenth aspect, this application provides a computer-readable storage medium. The computer-readable storage medium stores computer-readable instructions. When a computer reads and executes the computer-readable instructions, the computer is enabled to perform the method in any possible design of the first aspect to the eleventh aspect.

According to a fifteenth aspect, this application provides a computer program product. When a computer reads and executes the computer program product, the computer is enabled to perform the method in any possible design of the first aspect to the eleventh aspect.

According to a sixteenth aspect, this application provides a chip. The chip includes a processor. The processor is coupled to a memory, and is configured to read and execute a software program stored in the memory, to perform the method in any possible design of the first aspect to the eleventh aspect.

These aspects or other aspects in this application may be clearer and more intelligible in descriptions in the following embodiments.

DESCRIPTION OF EMBODIMENTS

Figure 1A:
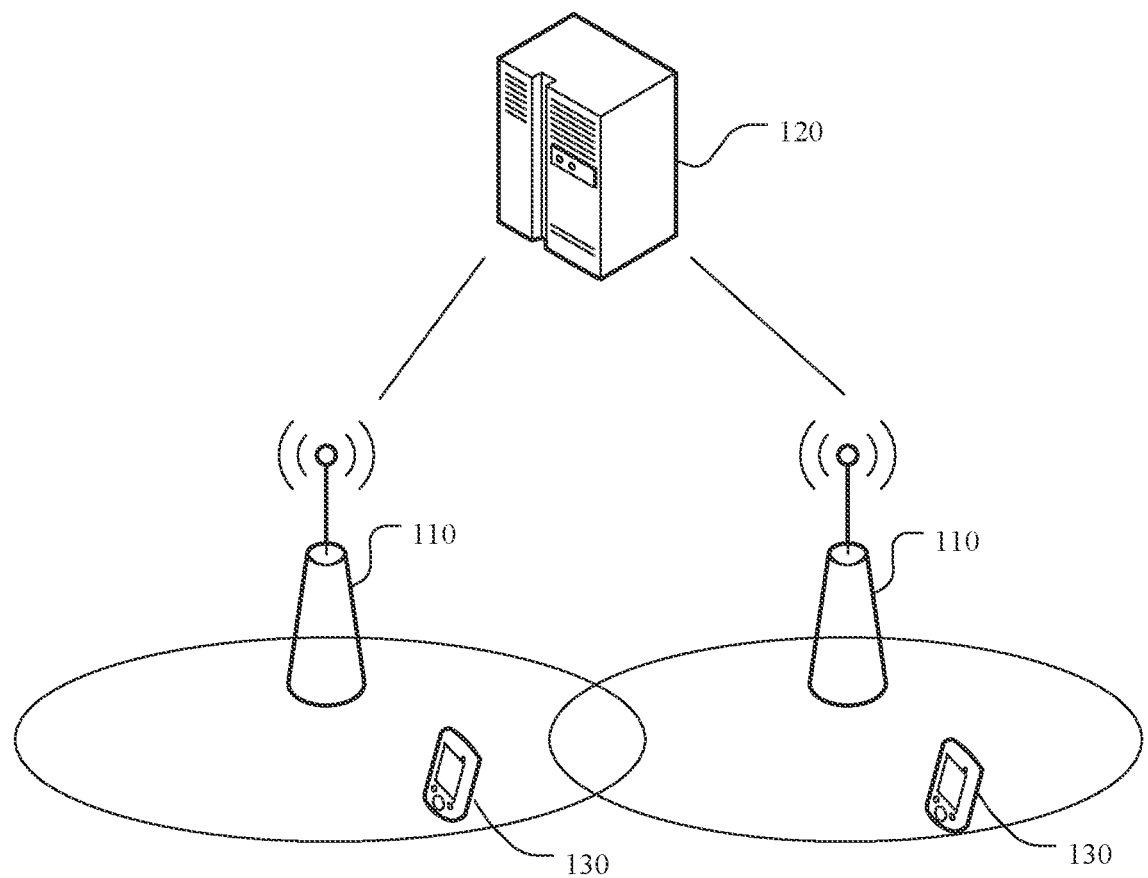
FIG. 1a is a schematic diagram of a network architecture to which an embodiment of this application is applicable.

The following describes technical solutions in embodiments of the present invention with reference to accompanying drawings in embodiments of the present invention. It is clear that the described embodiments are merely some rather than all of the embodiments of the present invention.

First, some terms in embodiments of this application are described, to help a person skilled in the art have a better understanding.

(1) Terminal device: The terminal device may be a wireless terminal device that can receive scheduling and indication information from a network device. The wireless terminal device may be a device that provides a user with voice and/or data connectivity, a handheld device with a wireless connection function, or another processing device connected to a wireless modem. The terminal device may communicate with one or more core networks or the Internet by using a radio access network (radio access network, RAN). The terminal device may be a mobile terminal device, for example, a mobile phone (or referred to as a cellular phone or a mobile phone (mobile phone)), a computer, or a data card. For example, the terminal device may be a portable, pocket-sized, handheld, computer built-in, or in-vehicle mobile apparatus that exchange language and/or data with the radio access network. For example, the terminal device may be a device such as a personal communications service (personal communications service, PCS) phone, a cordless phone, a session initiation protocol (SIP) phone, a wireless local loop (wireless local loop, WLL) station, a personal digital assistant (personal digital assistant, PDA), a tablet computer (Pad), or a computer with a wireless transceiver function. The wireless terminal device may also be referred to as a system, a subscriber unit (subscriber unit), a subscriber station (subscriber station), a mobile station (mobile station), a mobile station (mobile station, MS), a remote station (remote station), an access point (access point, AP), a remote terminal device (remote terminal), an access terminal device (access terminal), a user terminal device (user terminal), a user agent (user agent), a subscriber station (subscriber station, SS), a customer premises equipment (customer premises equipment, CPE), a terminal (terminal), a user equipment (user equipment, UE), a mobile terminal (mobile terminal, MT), or the like. The terminal device may also be a wearable device, a terminal device in a next-generation communication system such as a 5G communication system, a terminal device in a future evolved public land mobile network (public land mobile network, PLMN), or the like.

(2) Network device: The network device may be a device in a wireless network. For example, the network device may be a radio access network (radio access network, RAN) node (or device) through which the terminal device accesses the wireless network, or may be referred to as a base station. Currently, some examples of the RAN device are: a next-generation NodeB (generation NodeB, gNodeB) in a 5G communication system, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), or the like. In addition, in a network structure, the network device may include a centralized unit (centralized unit, CU) node, a distributed unit (distributed unit, DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as a network device.

(3) Terms: The terms "system" and "network" may be used interchangeably in embodiments of this application. "At least one" means one or more, and "a plurality of" means two or more. "And/or" describes an association relationship between associated objects, and indicates that there may be three relationships. For example, A and/or B may indicate the following cases: Only A exists, both A and B exist, and only B exists, where A and B may be singular or plural. The character "/" usually indicates an "or" relationship between associated objects. "At least one item (piece) of the following" or a similar expression thereof refers to any combination of these items, including any combination of singular items (pieces) or plural items (pieces). For example, "at least one of A. B, or C" includes A, B, C, AB, AC, BC, or ABC.

In addition, unless specifically specified, ordinal numbers such as "first" and "second" in embodiments of this application are used to distinguish between a plurality of objects, but are not intended to limit an order, a time sequence, priorities, or importance of the plurality of objects. For example, a first network device and a second network device are merely used to distinguish between different network devices, but do not indicate different priorities, importance, or the like of the two network devices.

FIG. 1a is a schematic diagram of a network architecture to which an embodiment of this application is applicable. As shown in FIG. 1a, a terminal device 130 may access a wireless network, to access a service of an external network (for example, the Internet) by using the wireless network, or communicate with another device by using the wireless network, for example, may communicate with another terminal device. The wireless network includes a radio access network (radio access network, RAN) device 110 and a core network (core network, CN) device 120. The RAN device 110 is configured to connect the terminal device 130 to the wireless network, and the CN device 120 is configured to manage the terminal device and provide a gateway for communicating with the external network. It should be understood that quantities of devices in the communication system shown in FIG. 1a are merely used as an example. This embodiment of this application is not limited thereto. In an actual application, the communication system may further include more terminal devices 130 and more RAN devices 110, and may further include another device.

For example, the network architecture shown in FIG. 1a is applicable to a PLMN or an NTN. The NTN may include a satellite communication system, a high altitude platform station (high altitude platform station, HAPS) communication system, or another non-terrestrial communication system.

The following uses an example in which the network architecture shown in FIG. 1a is applicable to the satellite communication system to describe two possible scenarios: a scenario 1 and a scenario 2.

Figure 1B:
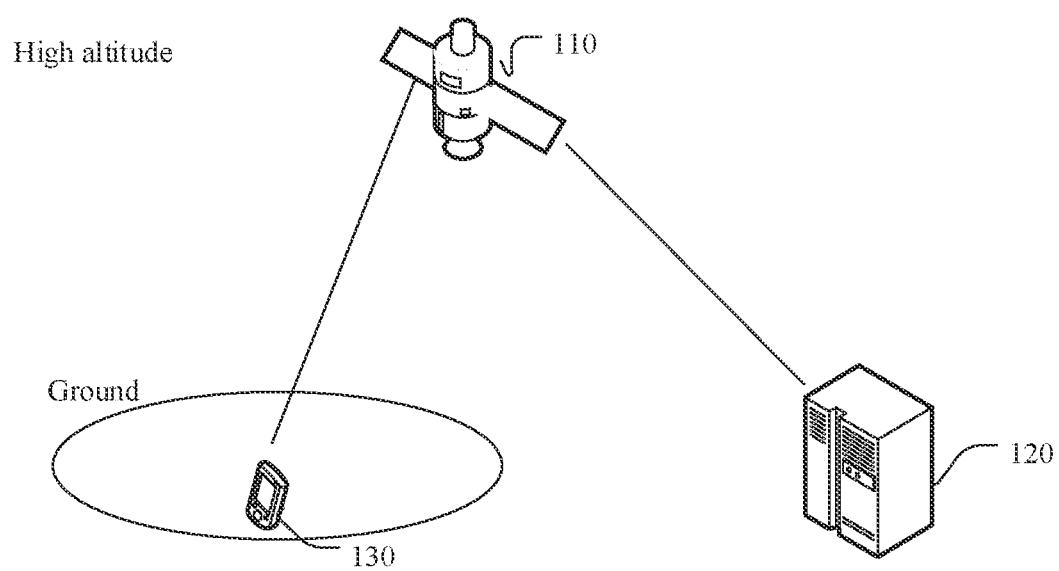
FIG. 1b is a schematic diagram of another network architecture to which an embodiment of this application is applicable.

FIG. 1b is a schematic diagram of a network architecture of the scenario 1 according to an embodiment of this application. As shown in FIG. 1b, an example in which the RAN device 110 is deployed on a satellite (for example, a near-earth orbit satellite) is used. This scenario may also be referred to as a regenerative payload (regenerative payload) scenario.

Figure 1C:
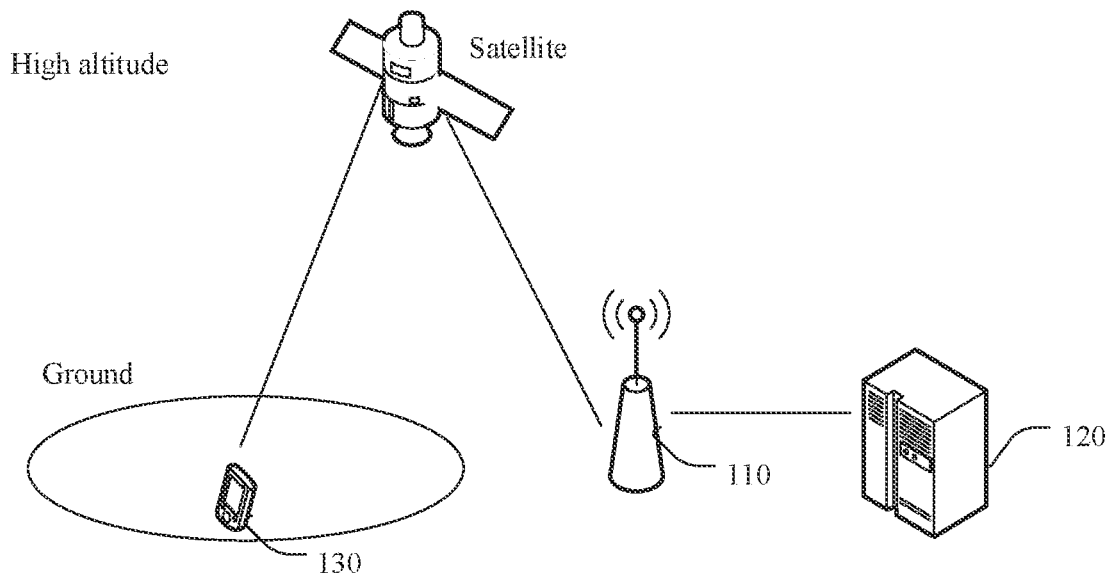
FIG. 1c is a schematic diagram of another network architecture to which an embodiment of this application is applicable.

FIG. 1c is a schematic diagram of a network architecture of the scenario 2 according to an embodiment of this application. As shown in FIG. 1c, the RAN device 110 is deployed on the ground, and a satellite forwards a signal when the terminal device 130 communicates with the RAN device 110. In this scenario, the satellite is equivalent to a relay node or a forwarder. This scenario may also be referred to as a transparent payload (transparent payload) scenario.

It should be noted that: (1) The satellite in embodiments of this application may refer to a satellite that can automatically adjust beams (NTN with steerable beams). For example, because the satellite continuously moves around the earth, a projection of a satellite signal on the ground continuously changes. Therefore, the satellite may automatically adjust the beams, so that the projection on the ground can remain unchanged as the satellite moves.

(2) The satellite in embodiments of this application may be a geostationary earth orbit (geostationary earth orbit, GEO) satellite, or may be a low earth orbit (low earth orbit, LEO) satellite. The low earth orbit satellite may also be referred to as a near-earth orbit satellite.

(3) The network architecture shown in FIG. 1a, FIG. 1b, or FIG. 1c is applicable to communication systems of various radio access technologies (radio access technologies, RATs). For example, the communication system may be an LTE communication system, may be a 5G (or referred to as new radio (new radio, NR)) communication system, or may be a transition system between the LTE communication system and the 5G communication system. The transition system may also be referred to as a 4.5G communication system. Certainly, the communication system may alternatively be a future communication system. A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of communication network architectures and emergence of new service scenarios, the technical solutions provided in embodiments of this application are also applicable to similar technical problems.

In the network architecture shown in FIG. 1a, FIG. 1b, or FIG. 1c, a terminal device may communicate with a network device. Communication between the terminal device and the network device may include uplink transmission and downlink transmission. Uplink transmission is used as an example. An important characteristic of uplink transmission is that different terminal devices perform orthogonal multiple access in time-frequency domain. In other words, uplink transmission of different terminal devices from a same cell does not interfere with each other. To ensure orthogonality of uplink transmission and avoid intra-cell interference, the network device requires that time at which signals from different terminal devices in a same subframe but on different frequency domain resources arrive at the network device be basically aligned. If the network device receives, in a range of a cyclic prefix (cyclic prefix, CP), uplink data sent by the terminal device, the network device can correctly decode the uplink data. Therefore, uplink synchronization requires that time at which signals from different terminal devices in a same subframe arrive at the network fall within the CP.

To implement uplink synchronization, the network device may indicate a timing advance (timing advance, TA) amount to the terminal device. Correspondingly, the terminal device may adjust an uplink transmission time based on the timing advance amount, so that time at which uplink data sent by the terminal devices arrives at the network device is aligned. The timing advance amount is related to a round-trip time of data transmission. For example, the timing advance amount may be twice the round-trip time of data transmission. From a perspective of the terminal device, the timing advance amount may be understood as a negative offset between a moment at which a downlink signal is received and a moment at which an uplink signal is transmitted. The network device may control, by controlling an offset of each terminal device, time at which uplink signals from different terminal devices arrive at the network device. For example, because a transmission delay of a terminal device far away from the network device is greater than that of a terminal device close to the network device, the terminal device far away from the network device may be controlled to send an uplink signal earlier than the terminal device close to the network device. The timing advance amount may also be referred to as a timing advance for short, and the timing advance may also be referred to as a time advance.

Figure 2:
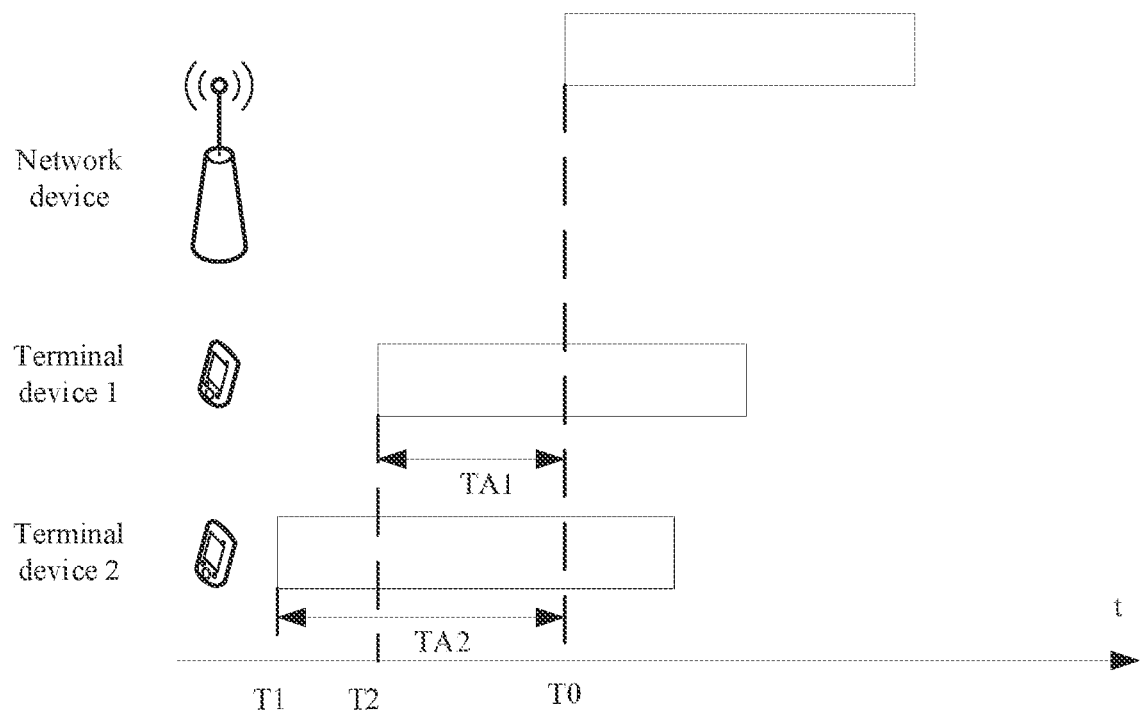
FIG. 2 is a schematic diagram of uplink synchronization according to an embodiment of this application.

For example, FIG. 2 is an example diagram of uplink synchronization. As shown in FIG. 2, a terminal device 2 is far away from a network device, and a terminal device 1 is close to the network device. To enable the network device to receive uplink data at a moment T0, the terminal device 1 needs to perform uplink transmission at a moment T2 based on a TA1, and the terminal device 2 needs to perform uplink transmission at a moment T1 based on a TA2 (where the TA2 is greater than the TA1).

The following describes a manner in which a network device indicates a timing advance amount to a terminal device in a PLMN.

In the PLMN, the network device may indicate the timing advance amount to the terminal device in a plurality of manners. For example, the network device may send a timing advance command to the terminal device, where the timing advance command is used to indicate the timing advance amount.

In a possible implementation, the network device may send the timing advance command to the terminal device in a random access procedure. For example, the network device may estimate the timing advance amount of the terminal device based on a random access preamble sent by the terminal device, and then send the timing advance command to the terminal device by using a random access response (random access response, RAR). Correspondingly, the terminal device may obtain the timing advance amount based on the timing advance command. In an LTE communication system, the timing advance command may include 11 bits (bits). In a 5G communication system, the timing advance command may include 12 bits. The timing advance command may indicate an index of the timing advance amount, so that the terminal device may calculate the timing advance amount based on the index of the timing advance amount.

In another possible implementation, the network device may send the timing advance command to a terminal device in a connected state. For example, after the terminal device achieves uplink synchronization with the network device in the random access procedure, the timing advance amount may be invalid due to a plurality of reasons. Therefore, the terminal device needs to continuously update the timing advance amount. For example, reasons why the timing advance amount is invalid may include: (1) For a terminal device in high-speed movement (for example, a terminal device on a running high-speed train), a transmission delay between the terminal device and the network device continuously changes. (2) A current transmission path disappears, and the terminal device switches to a new transmission path. For example, in a city with dense buildings, when the terminal device moves to a corner of a building, a current transmission path may disappear, and the terminal device needs to switch to a new transmission path. (3) A crystal oscillator of the terminal device is offset. Long-time offset accumulation may cause the timing advance amount to be invalid. (4) A Doppler frequency shift caused by movement of the terminal device may cause the timing advance amount to be invalid.

In this implementation, the network device may determine a timing advance amount of each terminal device by measuring uplink transmission of the terminal device. Therefore, when the terminal device performs uplink transmission, the network device may estimate the timing advance amount based on the uplink transmission. Theoretically, any signal sent by the terminal device may be used to estimate the timing advance amount. When the network device determines that a specific terminal device needs to be modified, the network device may send the timing advance command to the terminal device, to command the terminal device to adjust the timing advance amount. The network device may send the timing advance command to the terminal device by using a media access control (media access control, MAC) control element (control element, CE).

However, in an NTN, because a distance between a terminal device and a satellite is long, a round-trip time of data transmission between the terminal device and a network device is long. For example, for a GEO satellite, a maximum round-trip time may reach 541.46 ms, and for a LEO satellite, a maximum round-trip time may reach 25.77 ms. Therefore, in an NTN scenario, a timing advance amount required by a terminal device is much greater than a timing advance amount in a PLMN scenario. Because quantities of bits included in timing advance commands in a RAR and a MAC CE are limited, values of timing advance amounts indicated by the timing advance commands are also limited. Consequently, the foregoing described manner in the PLMN cannot be directly used to indicate the timing advance amount of the terminal device.

Based on this, embodiments of this application provide a communication method. The communication method is used by a terminal device to obtain a timing advance amount in the NTN scenario.

For example, in this embodiment of this application, the timing advance amount may be divided into two parts. One part is a common timing advance (common TA), and the other part is a terminal device specific timing advance (UE specific TA).

Figure 3A:
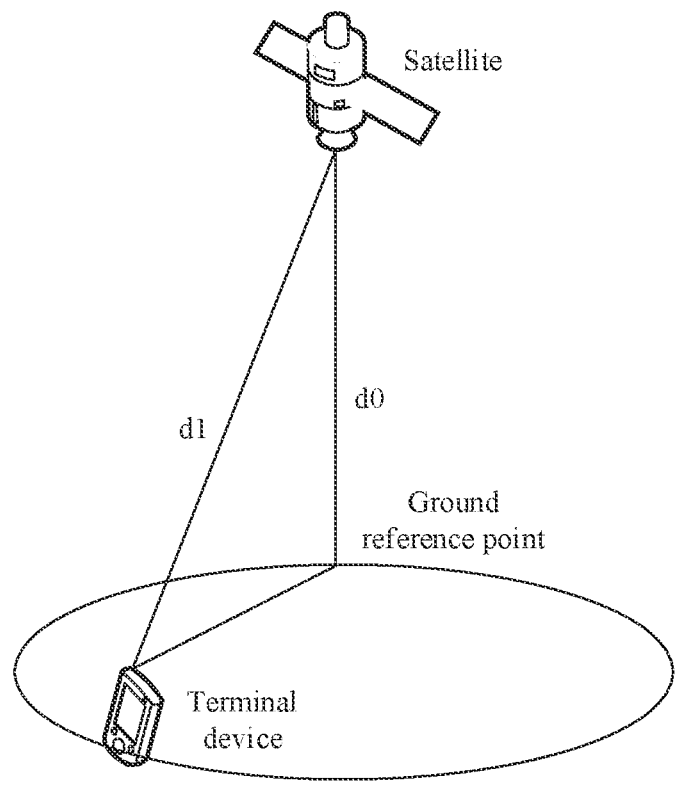
FIG. 3a is a schematic diagram of computing a common TA and a UE specific TA according to an embodiment of this application.

Refer to FIG. 3a. In the scenario shown in FIG. 1b, the common TA and the UE specific TA respectively meet the following formulas:

$$\text{common TA}=2*d0/c$$

$$\text{UE specific TA}=2*(d1-d0)/c$$

d0 represents a distance between a satellite and a ground reference point, and the ground reference point may be preset: d1 represents a distance between the satellite and a terminal device; and c represents the speed of light.

Figure 3B:
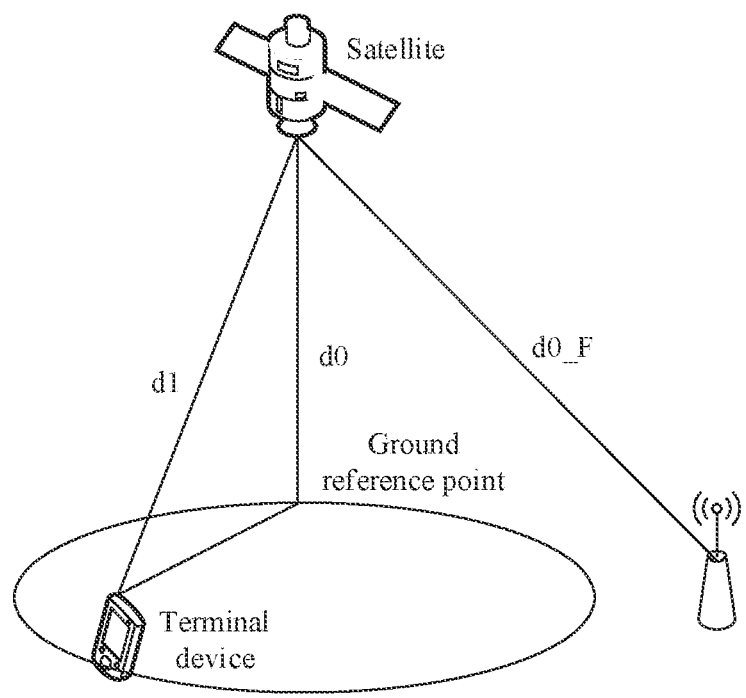
FIG. 3b is another schematic diagram of computing a common TA and a UE specific TA according to an embodiment of this application.

Refer to FIG. 3b. In the scenario shown in FIG. 1c, the common TA and the UE specific TA respectively meet the following formulas:

$$\text{common TA}=2*(d0+d0\_F)/c$$

$$\text{UE specific TA}=2*(d1-d0)/c$$

d0_F represents a distance between the satellite and a network device.

It can be learned from the foregoing content that the common TA is related to d0, and d0 continuously changes as the satellite moves. Therefore, the common TA also continuously changes as the satellite moves. It may be understood that in the NTN scenario, another parameter related to d0 also continuously changes as the satellite moves. Therefore, the terminal device needs to be frequently notified to perform updating.

It can be learned from the foregoing descriptions that all terminal devices within coverage of the network device need to obtain the common TA. Therefore, in a possible manner, the network device may send the common TA by using a system message. Correspondingly, the terminal device may obtain the common TA by reading the system message. The system message may include a plurality of system information blocks (system information blocks, SIBs), for example, a SIB a, a SIB b, and a SIB c. The common TA may be carried in at least one SIB. For example, the common TA is carried in the SIB a. However, because the common TA continuously changes (that is, the SIB a continuously changes), the system message frequently changes. Correspondingly, the terminal device needs to frequently read the system message. Consequently, power consumption of the terminal device is increased. Further, the plurality of system information blocks included in the system message correspond to a same change periodicity. When a system information block included in the system message changes, the terminal device needs to read the system message based on the change periodicity. For example, when the SIB a changes and the SIB b and the SIB c do not change, the terminal device needs to read the system message, that is, read the SIB a, the SIB b, and the SIB c, based on the change periodicity. Consequently, the terminal device frequently reads an unnecessary system message (for example, the SIB b and the SIB c), and the power consumption is high.

In view of the foregoing problem, in embodiments of this application, how to obtain the common TA and the UE specific TA (that is, obtain the timing advance amount) is studied, to reduce the power consumption of the terminal device.

The following describes the technical solutions provided in embodiments of this application in detail with reference to Embodiment 1 to Embodiment 5.

The following provides descriptions by using an example in which the method is applied to the network architecture shown in FIG. 1b or FIG. 1c. In addition, the method may be performed by two communication apparatuses. For example, the two communication apparatuses are a first communication apparatus and a second communication apparatus. The first communication apparatus may be a network device or a communication apparatus that can support the network device in implementing a function required in the method, or certainly may be another communication apparatus, for example, a chip or a chip system. The second communication apparatus may be a terminal device or a communication apparatus that can support the terminal device in implementing a function required in the method, or certainly may be another communication apparatus, for example, a chip or a chip system. For ease of description, in the following, an example in which the method is performed by a network device and a terminal device is used. In other words, an example in which the first communication apparatus is the network device and the second communication apparatus is the terminal device is used. If embodiments are applied to the network architecture shown in FIG. 1b or FIG. 1c, the following network device configured to perform an embodiment shown in FIG. 4a, FIG. 5, FIG. 6a, FIG. 7, or FIG. 8 may be the network device in the system architecture shown in FIG. 1b or FIG. 1c, and the following terminal device configured to perform the embodiment shown in FIG. 4a, FIG. 5, FIG. 6a, FIG. 7, or FIG. 8 may be the terminal device in the system architecture shown in FIG. 1b or FIG. 1c.

For example, the communication method provided in embodiments of this application may include five possible solutions. For ease of description, the five solutions are referred to as a solution 1 to a solution 5.

In the solution 1, the network device may broadcast a first duration by using a system message. If determining that the first duration needs to be obtained, the terminal device may receive the system message from the network device, obtain the first duration, and further determine a timing advance amount based on the first duration. According to this solution, the terminal device reads the system message when determining that the first duration needs to be obtained. In other words, that the terminal device reads the system message is not limited by an existing system message changing mechanism. Therefore, it can be ensured that the terminal device obtains the first duration, and the terminal device can also be effectively prevented from frequently reading the system message, to reduce power consumption of the terminal device.

In the solution 2, the network device sends an auxiliary parameter to the terminal device, and the terminal device may determine a first duration based on the auxiliary parameter, and further determine a timing advance amount based on the first duration. According to this solution, the terminal device may determine the first duration based on the auxiliary parameter, so that the terminal device can be effectively prevented from frequently reading a system message, to reduce power consumption of the terminal device. Further, the auxiliary parameter usually does not change frequently (where for example, the auxiliary parameter may include location information of a ground reference point, or the auxiliary parameter includes location information of a ground reference point and location information of the network device, and the location information of the ground reference point and the location information of the network device are usually static). Therefore, the network device does not need to frequently send the auxiliary parameter to the terminal device for a plurality of times, so that transmission resources can be effectively saved. In addition, the terminal device determines the first duration based on the auxiliary parameter, and the network device does not need to determine the first duration, so that processing load of the network device can be effectively reduced.

In the solution 3, the network device may send a first duration by using a first system message. A change periodicity of the first system message is different from that of a second system message from the network device. In other words, the network device may design a new change periodicity for the first system message. In this way, the terminal device may read the first system message based on the change periodicity of the first system message, and does not need to read a system message other than the first system message. Therefore, the terminal device can be effectively prevented from reading an unnecessary system message, and power consumption of the terminal device can be reduced. In addition, the network device may further send indication information to the terminal device, where the indication information is used to indicate that the first system message changes. The terminal device may read the first system message based on the indication information, so that the terminal device is prevented from frequently reading the first system message, and power consumption of the terminal device is further reduced.

In the solution 4, a source network device may obtain a first duration from a target network device, and then send the first duration to the terminal device by using an RRC reconfiguration message, so that the terminal device does not need to read a system message of the target network device to obtain the first duration, and power consumption of the terminal device is effectively reduced.

In the solution 5, the network device may send a first duration to the terminal device by using a PDCCH order, so that the terminal device does not need to read a system message of the network device to obtain the first duration, and power consumption of the terminal device is effectively reduced. In addition, because the first duration that needs to be used by the terminal device is explicitly indicated by using the PDCCH order, a problem that the terminal device does not know which first duration to be used when the network device has a plurality of first durations is avoided.

Moreover, when the first duration changes, the network device may quickly indicate a changed first duration to the terminal device by using the PDCCH order, so that the terminal device can obtain the changed first duration in time.

It should be noted that in embodiments of this application, the first duration may be a common TA, and a second duration may be a UE specific TA.

Embodiment 1

In Embodiment 1, a possible implementation of the communication method is described based on the foregoing solution 1.

Figure 4A:
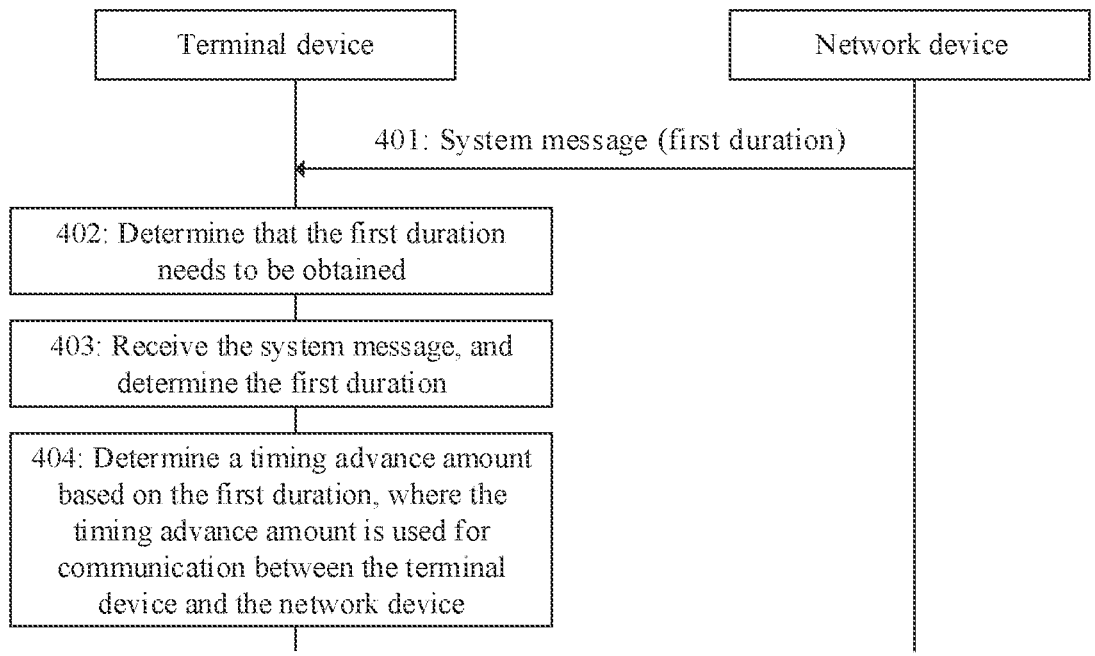
FIG. 4a is a schematic flowchart corresponding to a communication method according to Embodiment 1 of this application.

FIG. 4a is a schematic flowchart corresponding to the communication method according to Embodiment 1 of this application. As shown in FIG. 4a, the communication method includes the following steps.

Step 401: A network device sends a system message, where the system message is used to indicate a first duration.

For example, the system message may indicate the first duration in a plurality of manners. For example, the system message includes the first duration, or the system message includes information (for example, an index of the first duration) used to indicate the first duration. This is not specifically limited.

For example, the system message may include a first system information block, and the first system information block may be used to indicate the first duration. The first system information block may be a newly defined system information block, for example, a SIB X. The following is an example of a configuration format of the SIB X:

```
--ASN1START
SystemInformationBlockX-r16    ::= SEQUENCE {
    TACommonSIB-Element-r16         OCTET STRING
    lateNonCriticalExtension        OCTET STRING
    ...
}
--ASN1STOP
```

Figure 4B:
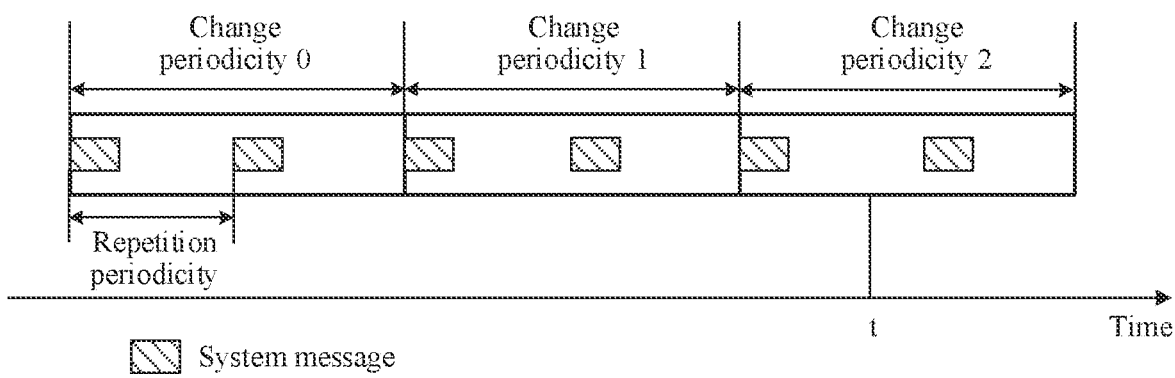
FIG. 4b is a schematic diagram of system messages periodically sent by a network device according to an embodiment of this application.

In this embodiment of this application, the network device may periodically send the system message. For example, the network device may send the system message based on a repetition periodicity of the system message. FIG. 4b is a schematic diagram of system messages periodically sent by the network device. It should be noted that, in a system message change periodicity, content of system messages sent by the network device based on a repetition periodicity may be the same.

Optionally, a change periodicity and/or a repetition periodicity used by the network device to send the SIB X may be different from a change periodicity and/or a repetition periodicity used to send a system message other than the SIB X. The repetition periodicity may also be referred to as a sending periodicity.

Step 402: A terminal device determines that the first duration needs to be obtained.

In this embodiment, that a terminal device determines that the first duration needs to be obtained may be understood as that the terminal device determines that the first duration needs to be obtained from the network device.

There may be a plurality of manners in which the terminal device determines that the first duration needs to be obtained. The following provides descriptions with reference to an example a1 and an example a2.

Example a1: If the terminal device determines to trigger a random access procedure, the terminal device may determine that the first duration needs to be obtained. That the terminal device determines to trigger a random access procedure may include: The terminal device sends a random access request to the network device, or the terminal device determines to send a random access request to the network device. The random access request may be a message 1 (Msg 1) in a four-step random access procedure, or may be a message A (MsgA) in a two-step random access procedure.

Example a2: If the terminal device determines to trigger a random access procedure, and there is no available first duration and/or the terminal device has no positioning capability, the terminal device may determine that the first duration needs to be obtained. (1) That there is no available first duration may also be referred to as that there is no valid first duration. That there is no available first duration may include that a first duration obtained by the terminal device last time is invalid. For example, after obtaining the first duration, the terminal device may start a timer. If the timer expires, it indicates that the first duration is invalid. A duration of the timer may be indicated by the network device. For example, the network device may indicate the duration of the timer by using a system message. Alternatively, that there is no available first duration may include that the terminal device has not obtained the first duration. (2) That the terminal device has no positioning capability may be understood as that the terminal device cannot obtain related information (for example, a distance between a satellite and a ground reference point) based on a positioning capability of the terminal device, to determine the first duration.

It should be noted that there may be a plurality of events that trigger the random access procedure. Examples are as follows: (1) The terminal device performs initial access, and establishes a wireless connection when changing from a radio resource control (radio resource control, RRC) idle (RRC_IDLE) state to an RRC connected (RRC_CONNECTED) state. (2) An RRC connection re-establishment procedure (RRC connection re-establishment procedure) is performed. (3) Handover (handover) is performed. (4) In the RRC_CONNECTED state, when downlink data arrives (where in this case, an acknowledgment (acknowledgment, ACK)/negative acknowledgment (negative acknowledgment, NACK) needs to be returned), an uplink is in an "asynchronized" state. (5) In the RRC_CONNECTED state, when uplink data arrives (for example, a measurement report needs to be reported or user data needs to be sent), the uplink is in the "asynchronized" state or there is no available physical uplink control channel (physical uplink control channel, PUCCH) resource for scheduling request (scheduling request, SR) transmission (where in this case, a terminal device in uplink synchronization is allowed to use a random access channel (random access channel, RACH) to replace the SR). Other examples are as follows: (1) In an inactive (Inactive) state, uplink (uplink, UL) data arrives, and in this case, an uplink is in an "asynchronized" state. (2) In the inactive state, downlink (downlink. DL) data arrives, and in this case, the uplink is in the "asynchronized" state. (3) An On-demand system message (system information, SI) is requested (where in a 5G communication system, system messages are classified into two types: minimum SI and On-demand SI, where the minimum SI needs to be received by all terminal devices, and the On-demand SI may be requested based on a requirement of the terminal device). (4) Beam failure recovery (beam failure recovery, BFR) is performed. Events or reasons for triggering the random access procedure described in the foregoing example a1 and example a2 do not include requesting a system message (for example, requesting the On-demand system message) or the beam failure recovery.

Step 403: The terminal device receives the system message, and obtains the first duration (or in other words, determines the first duration).

For example, the terminal device may read the SIB X, to obtain the first duration.

In a possible implementation, after the terminal device determines that the first duration needs to be obtained (for example, the terminal device determines to trigger the random access procedure), the terminal device may immediately receive the system message to obtain the first duration, or may prepare to receive the system message at a nearest sending moment of the system message, or may receive the system message from the network device in a same system message change periodicity, a same frame, a same subframe, a same slot, or a same sub-slot (sub-slot) in which the random access procedure is triggered. For example, refer to FIG. 4*b*. The terminal device determines, at a moment t, to trigger the random access procedure, where the moment t is in a change periodicity 2, so that the terminal device may receive a system message in a same change periodicity (namely, the change periodicity 2).

It may be understood that, that the terminal device determines to trigger the random access procedure may include: The terminal device sends the random access request to the network device, or the terminal device determines to send the random access request to the network device. Therefore, the terminal device may receive the system message to obtain the first duration after sending the random access request. Alternatively, the terminal device may receive the system message to obtain the first duration before sending the random access request. Alternatively, the terminal device may send the random access request and receive the system message simultaneously. This is not specifically limited.

Step 404: The terminal device determines a timing advance amount based on the first duration, where the timing advance amount is used for communication between the terminal device and the network device. For example, the terminal device may send an uplink signal to the network device based on the timing advance amount.

For example, the terminal device may obtain a second duration, and determine the timing advance amount based on the first duration and the second duration. The terminal device may obtain the second duration in a plurality of manners. The following provides descriptions with reference to an example b1 and an example b2.

Example b1: The terminal device may receive a random access response from the network device, where the random access response is used to indicate the second duration.

Example b2: The terminal device may receive a random access response from the network device, where the random access response is used to indicate a fourth duration. Further, the terminal device may receive an adjustment value of the fourth duration from the network device, and determine the second duration based on the fourth duration and the adjustment value. The adjustment value may be carried in a MAC CE or another possible message from the network device.

In this example, in consideration of the fact that the terminal device has mobility, the fourth duration indicated by the random access response may be different from a current UE specific TA due to reasons such as movement of the terminal device. Therefore, after the network device sends the random access response to the terminal device, if determining that the fourth duration is different from the current UE specific TA, the network device may send the adjustment value to the terminal device, so that the terminal device can obtain the current UE specific TA (namely, the second duration) based on the fourth duration and the adjustment value. In this way, accuracy of the UE specific TA can be effectively ensured. In addition, because the network device can send the adjustment value to the terminal device without resending the UE specific TA, transmission resources can be effectively saved.

It should be noted that, the random access response may indicate the second duration (or the fourth duration) in a plurality of manners. For example, the random access response includes the second duration, or the random access response includes information (for example, an index of the second duration) used to indicate the second duration. This is not specifically limited. For example, a timing advance command of a random access response in a PLMN may be used to indicate the second duration (or the fourth duration).

According to the foregoing method, the terminal device reads the system message to obtain the first duration when determining that the first duration needs to be obtained, so that the terminal device can be effectively prevented from frequently reading the system message, to reduce power consumption of the terminal device.

Embodiment 2

In Embodiment 2, a possible implementation of the communication method is described based on the foregoing solution 2.

Figure 5:
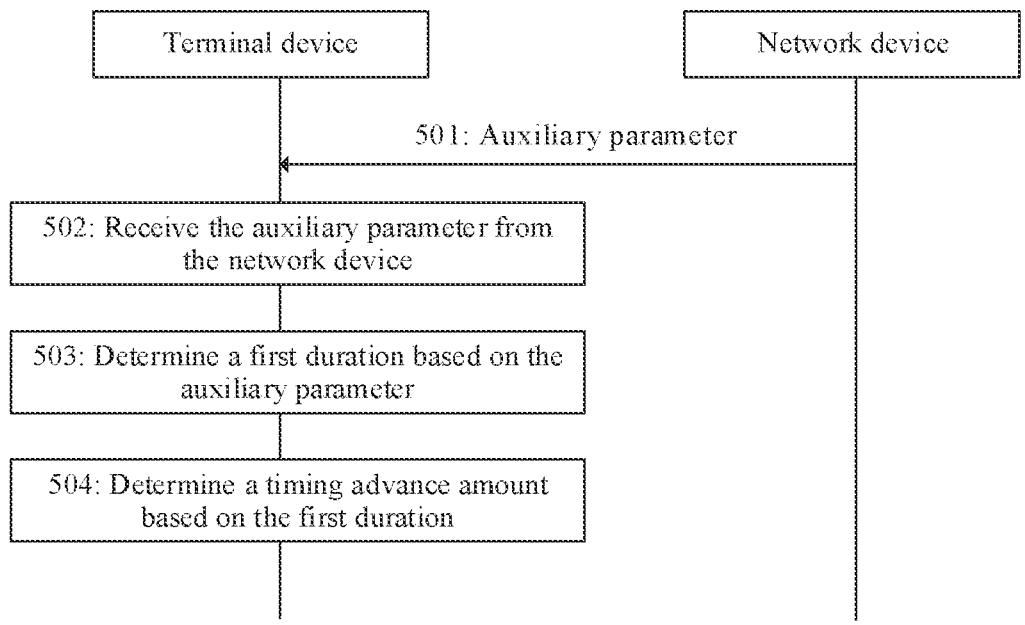
FIG. 5 is a schematic flowchart corresponding to a communication method according to Embodiment 2 of this application.

FIG. 5 is a schematic flowchart corresponding to the communication method according to Embodiment 2 of this application. As shown in FIG. 5, the communication method includes the following steps.

Step 501: A network device sends an auxiliary parameter to a terminal device.

Correspondingly, in step 502, the terminal device receives the auxiliary parameter from the network device.

Herein, the auxiliary parameter may include a plurality of pieces of possible information used to determine a first duration. The following provides descriptions with reference to an example c1 and an example c2.

Example c1: The auxiliary parameter includes location information of a ground reference point, or the auxiliary parameter includes location information of a ground reference point and location information of the network device. For example, when this embodiment of this application is applied to the scenario shown in FIG. 1b, the auxiliary parameter may include the location information of the ground reference point; when this embodiment of this application is applied to the scenario shown in FIG. 1c, the auxiliary parameter may include the location information of the ground reference point and the location information of the network device.

Example c2: The auxiliary parameter includes at least one of the following: an initial value (or an index of the initial value) of the first duration, information about a moment corresponding to the initial value, or a change rate of the first duration.

Examples are as follows: (1) The initial value of the first duration may be an absolute time amount. When the auxiliary parameter includes the index of the initial value, the terminal device may determine the corresponding initial value based on the index, for example, obtain the corresponding initial value by searching a table based on the index. (2) The moment corresponding to the initial value may be a moment measured based on an absolute time (for example, a coordinated universal time (coordinated universal time, UTC) or a global positioning system (global positioning system, GPS) time). UTC timing is used as an example. The moment corresponding to the initial value may be X1 year X2 month X3 day X4 hour X5 minute X6 second X7 millisecond. Time precision is not limited in this embodiment of this application. For example, the time may be further accurate to microseconds or nanoseconds. Alternatively, the moment corresponding to the initial value may be a system frame boundary, a slot boundary, a mini-slot boundary, a subframe boundary, or the like. (3) The change rate of the first duration may be a rate value that changes with time, or may be a step value that changes with time.

In this embodiment of this application, the network device may send the auxiliary parameter to the terminal device in a plurality of manners. For example, the network device may send a system message to the terminal device, where the system message includes the auxiliary parameter.

Step 503: The terminal device determines the first duration based on the auxiliary parameter.

It may be understood that, for different content included in the auxiliary parameter sent by the network device, manners in which the terminal device determines the first duration based on the auxiliary parameter are also different. The following separately describes possible implementations of determining the first duration by the terminal device based on the auxiliary parameter for the example c1 and the example c2.

(1) For the example c1:

The terminal device may further obtain location information of a satellite, and determine the first duration based on the location information of the satellite and the auxiliary parameter. The terminal device may obtain the location information of the satellite in a plurality of manners. For example, the terminal device may obtain a satellite ephemeris (satellite ephemeris), and then determine the location information of the satellite based on the satellite ephemeris. The satellite ephemeris includes location information and orbit behavior information of a celestial body such as the satellite, and may be used to calculate, predict, describe, and track a running status such as a time, a location, and a speed of a flying object (for example, the satellite). The satellite ephemeris can represent a precise parameter of a flying object such as the celestial body, the satellite, a spacecraft, a missile, or space garbage.

The terminal device may obtain the satellite ephemeris in a plurality of manners. In a possible manner, the terminal device may obtain the satellite ephemeris from the network device or a core network device. For example, the terminal device receives a system message from the network device, where the system message includes the satellite ephemeris; or the terminal device receives a non-access stratum (non-access stratum, NAS) message from the core network device, where the NAS message includes the satellite ephemeris. In another possible manner, the satellite ephemeris may be preconfigured. For example, the satellite ephemeris may be stored in a subscriber identity module (Subscriber Identity Module, SIM) card of the terminal device, so that the terminal device may obtain the satellite ephemeris from the SIM card.

Further, when the auxiliary parameter includes the location information of the ground reference point, the terminal device may determine a distance (namely, d0) between the satellite and the ground reference point based on the location information of the satellite and the location information of the ground reference point, so that the terminal device can determine the first duration. When the auxiliary parameter includes the location information of the ground reference point and the location information of the network device, the terminal device may determine a distance (namely, d0) between the satellite and the ground reference point based on the location information of the satellite and the location information of the ground reference point, and determine a distance (namely, d0_F) between the satellite and the network device based on the location information of the satellite and the location information of the network device, so that the terminal device can determine the first duration.

(2) For the example c2:

In this example, the auxiliary parameter and the first duration meet a calculation relationship, for example, a function relationship. The calculation relationship may be pre-determined. Further, the terminal device may determine the first duration based on the auxiliary parameter.

For example, the auxiliary parameter includes the initial value of the first duration, the information about the moment corresponding to the initial value, and the change rate of the first duration. For example, the initial value of the first duration is TA0, the moment corresponding to the initial value is t0, the change rate of the first duration is k, and a current moment is t1. In this case, the terminal device may calculate a first duration at the current moment based on a function F(TA0, k, t0) of the initial value of the first duration, the moment corresponding to the initial value, and the change rate of the first duration. For example, F(TA0, k, t0)=TA0+k*(t1−t0).

In an optional solution, if the terminal device determines that the first duration needs to be obtained, the terminal device may determine the first duration based on the auxiliary parameter. Herein, that the terminal device determines that the first duration needs to be obtained may be understood as that the terminal device determines that the first duration needs to be determined based on the auxiliary parameter. There may be a plurality of manners in which the terminal device determines that the first duration needs to be obtained. For example, the terminal device determines to trigger a random access procedure. Refer to the descriptions in Embodiment 1.

Step 504: The terminal device determines a timing advance amount based on the first duration.

For example, for an implementation of step 504, refer to step 404 in Embodiment 1. Details are not described again.

According to the foregoing method, the terminal device may determine the first duration based on the auxiliary parameter. Compared with a manner in which the terminal device frequently reads the system message to obtain the first duration, this method reduces power consumption of the terminal device. In addition, when the auxiliary parameter includes the initial value of the first duration, the information about the moment corresponding to the initial value, and the change rate of the first duration, because the terminal device does not need to obtain the satellite ephemeris, and bit overheads required for the initial value of the first duration, the information about the moment corresponding to the initial value, and the change rate of the first duration are low, transmission resources can be effectively saved.

Embodiment 3

In Embodiment 3, a possible implementation of the communication method is described based on the foregoing solution 3.

Figure 6A:
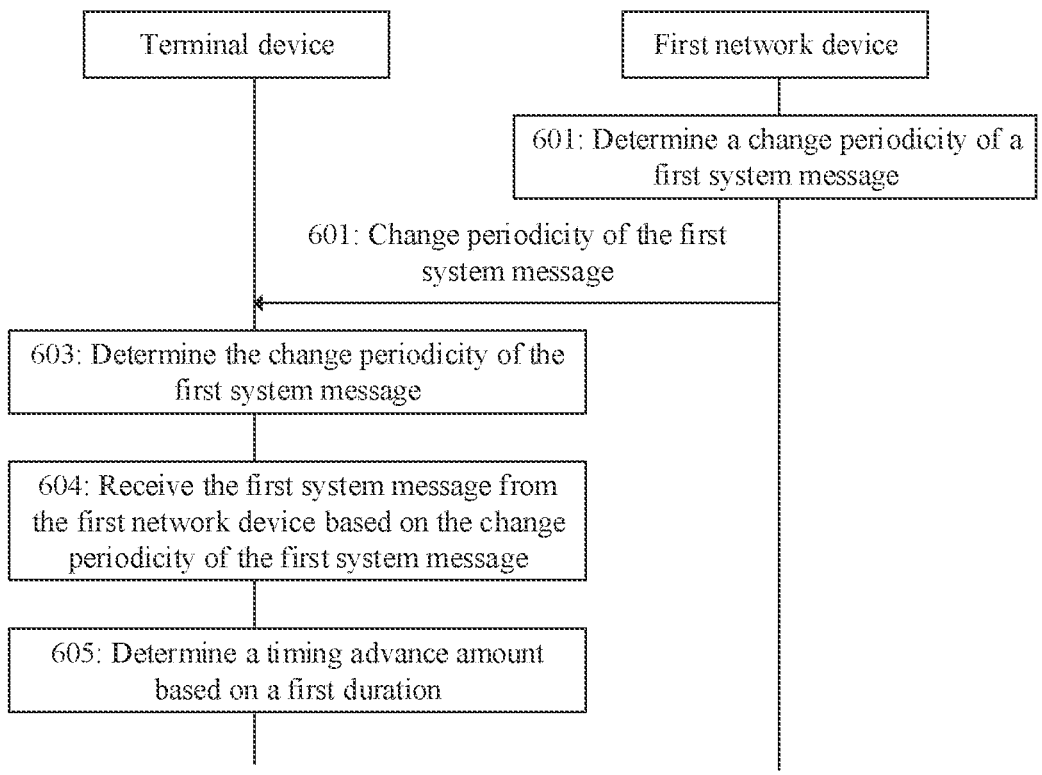
FIG. 6a is a schematic flowchart corresponding to a communication method according to Embodiment 3 of this application.

FIG. 6a is a schematic flowchart corresponding to the communication method according to Embodiment 3 of this application. As shown in FIG. 6a, the communication method includes the following steps.

Step 601: A first network device determines a change periodicity of a first system message.

Herein, the first system message may be used to indicate a first duration (referred to as a common TA1 for ease of description), the common TA1 is used to determine a first timing advance amount, and the first timing advance amount is used for communication between a terminal device and the first network device.

For example, the first system message may further be used to indicate one or more other common TAs. For example, the first system message may further be used to indicate a third duration (referred to as a common TA2), the common TA2 is used to determine a second timing advance amount, and the second timing advance amount is used for communication between the terminal device and a second network device. The first network device may be a serving network device of the terminal device, and the second network device is a candidate serving network device (or a next serving network device) of the terminal device. It may be understood that, in this embodiment of this application, an example in which the first system message is used to indicate the common TA1 and the common TA2 is used. In another possible embodiment, when the terminal device further has another candidate serving network device, the first system message may further carry another common TA. Because the terminal device has mobility, the terminal device may move from a coverage area of one network device to a coverage area of another network device. In this embodiment of this application, the common TA of the candidate serving network device is transmitted by using the first system message, so that service continuity can be effectively ensured.

For example, the first system message may include a first system information block, and the first system information block may be a newly defined system information block, for example, a SIB X. For details, refer to the descriptions in Embodiment 1.

Figure 6B:
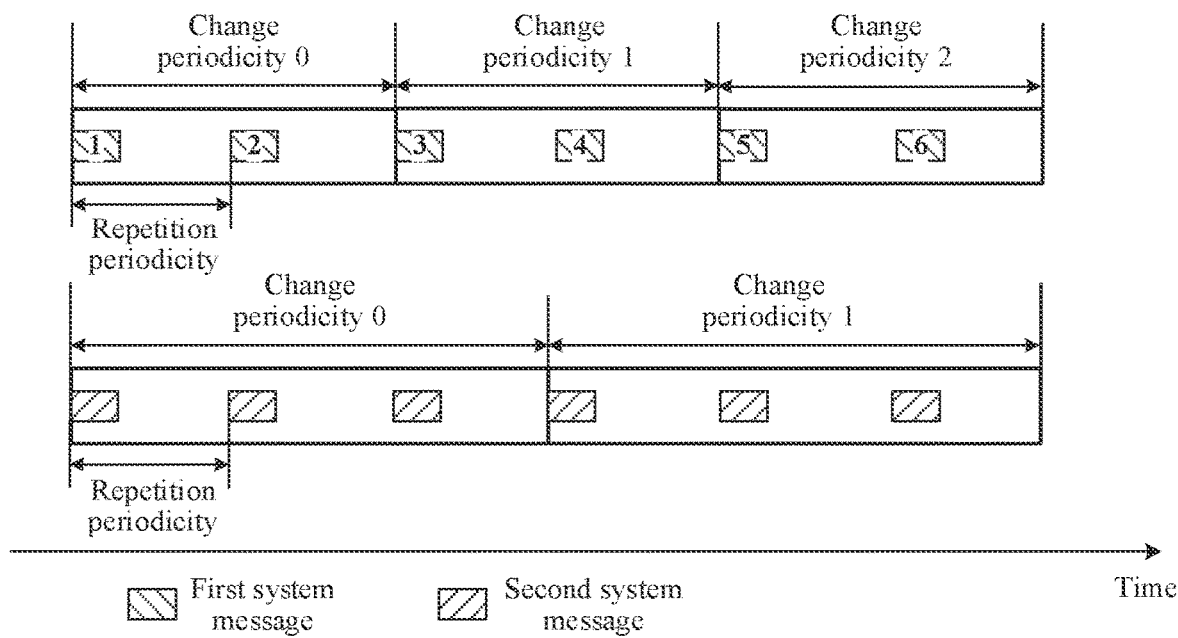
FIG. 6b is a schematic diagram of change periodicities of first system messages and change periodicities of second system messages according to an embodiment of this application.

For example, a change periodicity of the first system message is different from a change periodicity of a second system message, the second system message is from the first network device, and the second system message may be used to carry information other than information carried in the first system message. For example, the change periodicity of the first system message may be shorter than the change periodicity of the second system message. FIG. 6b shows an example of the change periodicity of the first system message and the change periodicity of the second system message.

Step 602: The first network device sends indication information 1 to the terminal device, where the indication information 1 is used to indicate the change periodicity of the first system message.

Correspondingly, in step 603, the terminal device receives the indication information 1 from the first network device, and determines the change periodicity of the first system message.

Step 604: The terminal device receives the first system message from the first network device based on the change periodicity of the first system message.

For example, the terminal device may receive the first system message based on the change periodicity of the first system message in a plurality of manners. The following describes two possible manners with reference to an implementation 1 and an implementation 2.

(1) Implementation 1

The terminal device may receive the first system message from the first network device in each change periodicity of the first system message. For example, refer to FIG. 6b. The terminal device may receive the first system message at a start boundary of each change periodicity, for example, receive a first system message 1 at a start boundary of a change periodicity 0, receive a first system message 3 at a start boundary of a change periodicity 1, receive a first system message 5 at a start boundary of a change periodicity 2, and so on.

It may be understood that the first system message may be transmitted for one or more times in each change periodicity. After successfully receiving the first system message once in a change periodicity, the terminal device may no longer receive another first system message in the change periodicity. For example, after successfully receiving the first system message 1 in the change periodicity 0, the terminal device may no longer receive a first system message 2.

(2) Implementation 2

If the terminal device determines that the first duration needs to be obtained, the terminal device may receive the first system message from the first network device based on the change periodicity of the first system message. There may be a plurality of manners in which the terminal device determines that the first duration needs to be obtained. For example, if the terminal device determines that a random access procedure is triggered, the terminal device determines that the first duration needs to be obtained. For details, refer to the descriptions in Embodiment 1. For another example, if the terminal device receives indication information 2 from the first network device, and the indication information 2 is used to indicate that the first system message changes, the terminal device determines that the first duration needs to be obtained.

Further, the terminal device may further receive an initial value of the first duration sent by the network device. For example, the network device may send the initial value of the first duration to the terminal device by using the second system message.

The network device may send the indication information 2 to the terminal device in a plurality of manners. For example, the network device may send the indication information 2 to the terminal device by using dedicated signaling. The dedicated signaling may be downlink control information (downlink control information, DCI) (referred to as DCI-1) or a MAC CE. This is not specifically limited. For example, the dedicated signaling is the DCI-1. The network device may further send PDCCH configuration information to the terminal device. The PDCCH configuration information may be used to monitor the DCI-1. For example, the PDCCH configuration information may include a search space and a control resource set associated with the search space, and may further include a radio network temporary identifier (radio network temporary identifier, RNTI) for scrambling the DCI-1. For example, the network device may send the initial value of the first duration and the PDCCH configuration information by using a same message, for example, send the initial value of the first duration and the PDCCH configuration information by using the second system message; or may send the initial value of the first duration and the PDCCH configuration information by using different messages.

In this embodiment of this application, there may be a plurality of manners in which the indication information 2 indicates that the first system message changes. The following describes some possible implementations with reference to an example d1 and an example d2.

Example d1: The indication information 2 may include one bit. When a value of the bit is 1, it indicates that the first system message changes. When a value of the bit is 0, it indicates that the first system message does not change.

Example d2: When the first system message is used to indicate the common TA1 and the common TA2, that the indication information 2 indicates that the first system message changes may include: The indication information 2 indicates that the common TA1 changes, and/or the indication information 2 indicates that the common TA2 changes.

In this case, the indication information 2 may indicate, in a form of a bitmap (bitmap), that the common TA1 changes and/or the common TA2 changes. For example, the indication information 2 includes two bits, and each bit corresponds to one common TA. For example, the network device and the terminal device may agree in advance on common TAs each corresponding to one bit in the indication information 2. For example, the $1^{st}$ bit corresponds to the common TA1, and the $2^{nd}$ bit corresponds to the common TA2. When a value of the $1^{st}$ bit is 1, it indicates that the common TA1 changes; or when a value of the first bit is 0, it indicates that the common TA1 does not change. The $2^{nd}$ bit is similar to the $1^{st}$ bit.

Further, when the indication information 2 indicates that the common TA1 changes, the terminal device may receive the first system message, to obtain the common TAL.

In the implementation 2, the terminal device may receive the first system message from the first network device in a plurality of manners. The following describes some possible implementations with reference to a case 1 and a case 2.

(1) Case 1

Figure 6C:
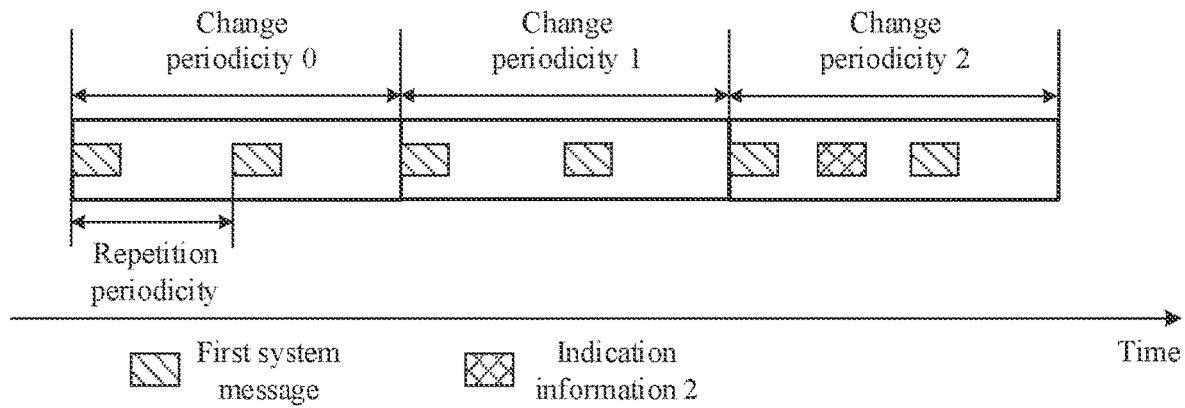
FIG. 6c is a schematic diagram of receiving first system messages in same change periodicities according to an embodiment of this application.

After receiving the indication information 2, the terminal device may immediately receive the first system message to obtain the first duration, or may prepare to receive the first system message at a nearest sending moment of the first system message, or may receive the first system message from the network device in a same change periodicity, a same frame, a same subframe, a same slot, or a same sub-slot (sub-slot) in which the indication information 2 is located. For example, refer to FIG. 6c. The indication information 2 is in a change periodicity 2. After receiving the indication information 2, the terminal device may receive the first system message in the same change periodicity (namely, the change periodicity 2).

(2) Case 2

After receiving the indication information 2, the terminal device may receive the first system message at a first moment to obtain the first duration. The terminal device may determine the first moment in a plurality of manners. In an example, the first moment may be predefined in a protocol. For example, the first moment may be a frame boundary, a subframe boundary, or a slot boundary closest to an end moment of a time domain resource carrying the indication information 2.

In another example, the network device may send indication information 3 to the terminal device, where the indication information 3 may be used to indicate the first moment, so that the network device may determine the first moment based on the indication information 3. The indication information 3 may be included in the indication information 2, or the indication information 3 and the indication information 2 may be sent by using a same message. This is not specifically limited. In this manner, the network device indicates the first moment, so that it can be effectively ensured that the terminal device obtains the first duration by using the first system message, and the terminal device does not need to continuously detect the first system message for a long time.

In this example, the indication information 3 may indicate the first moment in a plurality of manners. For example, in a possible indication manner, the indication information 3 may include time information of the first moment. For example, the first moment is a moment measured based on an absolute time. UTC timing is used as an example. If the first moment is X1 hour X2 minute X3 second X4 millisecond X5 microsecond, the indication information 3 may include values of X1, X2, X3, X4, and X5. In another possible indication manner, the indication information 3 may be used to indicate the first duration, and the first duration may be understood as a time offset. When the end moment of the time domain resource carrying the indication information 2 is used as a reference, the first moment may be obtained by adding the first duration to the end moment of the time domain resource carrying the indication information 2. In other words, the first duration may be a duration between the end moment of the time domain resource carrying the indication information 2 and the first moment, or the first duration is a time offset of the first moment relative to the end moment of the time domain resource carrying the indication information 2. A unit of the first duration may be a time unit measured based on an absolute time, for example, a second, a millisecond, a microsecond, or a nanosecond: or may be a slot, a mini-slot, a subframe, or the like; or may be another possible time unit. This is not specifically limited.

Step 605: The terminal device determines a timing advance amount based on the first duration.

For example, for an implementation of step 605, refer to step 404 in Embodiment 1. Details are not described again.

According to the foregoing method, because the network device designs a new change periodicity for the first system message, the terminal device may read the first system message based on the change periodicity of the first system message, and read the second system message based on the change periodicity of the second system message. Processes of reading the first system message and reading the second system message do not affect each other. For example, when the first duration carried in the first system message changes but information carried in the second system message does not change, the terminal device may read the first system message without reading the unnecessary second system message, and power consumption of the terminal device is effectively reduced.

Further, different change periodicities are set for system messages. For example, different change periodicities are set for the first system message and the second system message, so that the network device can transmit parameters with different change frequencies by using different system messages. For example, a parameter a has a higher change frequency, while a parameter b has a lower change frequency. In this case, a shorter change periodicity may be set for a system message for transmitting the parameter a, and a longer change periodicity may be set for a system message for transmitting the parameter b. This facilitates flexible parameter configuration in the NTN. In addition, the terminal device can receive a changed parameter in time, and does not need to read an unnecessary system message.

Embodiment 4

In Embodiment 4, a possible implementation of the communication method is described based on the foregoing solution 4.

When the terminal device is handed over from a source network device to a target network device, because a common TA corresponding to the source network device is different from a common TA corresponding to the target network device, the terminal device needs to learn of the common TA corresponding to the target network device.

Figure 7:
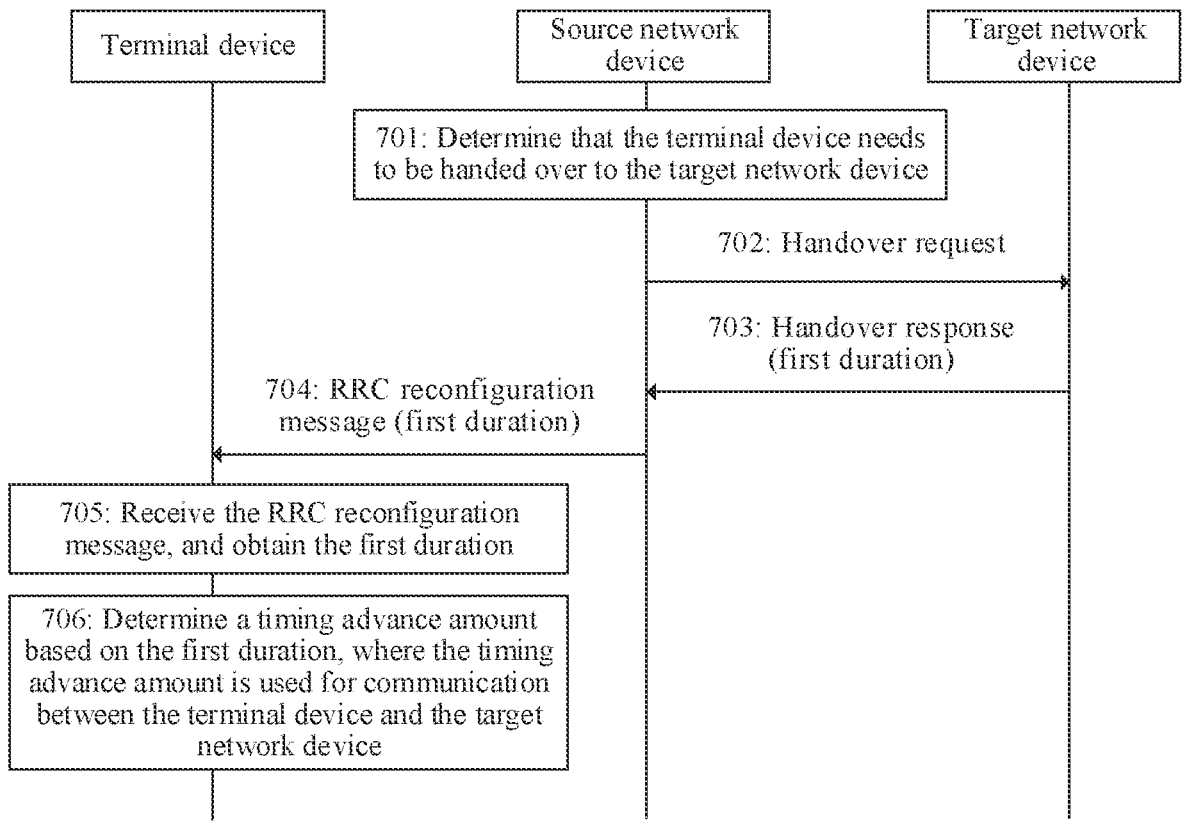
FIG. 7 is a schematic flowchart corresponding to a communication method according to Embodiment 4 of this application.

FIG. 7 is a schematic flowchart corresponding to the communication method according to Embodiment 4 of this application. As shown in FIG. 7, the communication method includes the following steps.

Step 701: The source network device determines that the terminal device needs to be handed over to the target network device.

Herein, the source network device may receive a measurement report of the terminal device, and then determine, based on the measurement report, that the terminal needs to be handed over to the target network device. For a specific implementation, refer to an existing solution.

Step 702: The source network device sends a handover request to the target network device.

Correspondingly, in step 703, the target network device receives the handover request, and sends a handover response to the source network device, where the handover response may include a first duration. The first duration is used to determine a timing advance amount, and the timing advance amount is used for communication between the terminal device and the target network device. In other words, the first duration is a first duration corresponding to the target network device. Further, the handover response may further include configuration information corresponding to the target network device. For example, the configuration information corresponding to the target network device may include a random access resource (for example, a random access preamble).

For example, the source network device may configure one target network device for the terminal device, or may configure a plurality of target network devices for the terminal device. When there are a plurality of target network devices, the source network device may separately send the handover request to the plurality of target network devices, to obtain first durations corresponding to the plurality of target network devices and configuration information corresponding to the plurality of target network devices.

Step 704: The source network device sends an RRC reconfiguration message to the terminal device, where the RRC reconfiguration message includes the first duration.

Correspondingly, in step 705, the terminal device receives the RRC reconfiguration message, to obtain the first duration.

Step 706: The terminal device determines the timing advance amount based on the first duration, where the timing advance amount is used for communication between the terminal device and the target network device.

The following separately describes some possible implementations of step 704 to step 706 with reference to a case 1 and a case 2.

Case 1

The source network device configures one target network device (for example, a target network device a) for the terminal device, and the RRC reconfiguration message may include a first duration corresponding to the target network device a. Correspondingly, after receiving the RRC reconfiguration message, the terminal device may obtain the first duration corresponding to the target network device a, to determine a timing advance amount 1. The timing advance amount 1 is used for communication between the terminal device and the target network device a.

Further, the RRC reconfiguration message may further include configuration information and/or a handover command that correspond to the target network device a. The configuration information corresponding to the target network device a may be used by the terminal device to initiate random access to the target network device a, and the handover command is used to indicate the terminal device to be handed over to the target network device a.

Case 2

The source network device configures a plurality of target network devices (for example, a target network device b1, a target network device b2, and a target network device b3) for the terminal device, and the RRC reconfiguration message may include a first duration (referred to as a common TA1) corresponding to the target network device b1, a first duration (referred to as a common TA2) corresponding to the target network device b2, and a first duration (referred to as a common TA3) corresponding to the target network device b3. In this case, in consideration of the fact that a plurality of target network devices may correspond to a same first duration (for example, in a case of transparent load, if relay nodes corresponding to the plurality of target network devices are a same satellite, the plurality of target network devices correspond to the same first duration), the RRC reconfiguration message may also include a unified first duration, and the first duration may be shared by the plurality of target network devices. Correspondingly, after receiving the RRC reconfiguration message, the terminal device may select one of the plurality of target network devices (for example, the selected target network device is the target network device b1), and obtain the first duration corresponding to the target network device b1, to determine a timing advance amount 2, where the timing advance amount 2 is used for communication between the terminal device and the target network device b1.

For example, the terminal device may select one of the plurality of target network devices in a plurality of manners. In a possible implementation, the terminal device may measure a plurality of target network devices based on measurement configuration information, and select one of the target network devices based on a measurement result. For example, if a measurement result of a target network device meets a first condition, the terminal device may select the target network device; if measurement results of two or more target network devices meet the first condition, the terminal device may select a target network device with an optimal measurement result, or the terminal device selects, based on a preset algorithm, one of the target network devices whose measurement results meet the first condition.

The measurement result may include reference signal received power (reference signal received power, RSRP) and/or reference signal received quality (reference signal received quality, RSRQ). In an example, the optimal measurement result may mean that the RSRP is a maximum value, and/or the RSRQ is a maximum value. For example, the target network devices whose measurement results meet the first condition include the target network device b1 and the target network device b2. A measurement result obtained by the terminal device by measuring the target network device b1 includes RSRP 1 and RSRQ 1. A measurement result obtained by the terminal device by measuring the target network device b2 includes RSRP 2 and RSRQ 2. RSRP 1 is greater than RSRP 2, and RSRQ 1 is equal to RSRQ 2. Therefore, the target network device with the optimal measurement result may be the target network device b1. In another example, the optimal measurement result may mean that the RSRP and/or the RSRQ has smallest fluctuation in a preset duration. The fluctuation of the RSRP and/or the RSRQ may be measured in a plurality of manners. This is not limited in this embodiment of this application.

For example, the measurement configuration information may be predefined in a protocol, or may be determined by the source network device and sent by the source network device to the terminal device. For example, the source network device may send the measurement configuration information to the terminal device by using the RRC reconfiguration message. The first condition may be predefined in a protocol, or may be determined by the source network device and sent by the source network device to the terminal device. For example, the source network device may send the first condition to the terminal device by using the RRC reconfiguration message.

In an example, the source network device may send, to the terminal device by using a same message, configuration information corresponding to a plurality of target network devices, first durations corresponding to the plurality of target network devices, measurement configuration information, a first condition, and a handover command (used to indicate the terminal device to be handed over to a selected target network device). For example, the RRC reconfiguration message includes the configuration information corresponding to the plurality of target network devices, the first durations corresponding to the plurality of target network devices, the measurement configuration information, the first condition, and the handover command.

For example, for an implementation of step 706, refer to step 404 in Embodiment 1. For example, the terminal device may receive a random access response from the target network device (for example, the target network device a or the target network device b1), where the random access response includes a second duration, and then the terminal device may determine the timing advance amount based on the first duration and the second duration.

According to the foregoing method, in a handover scenario, the source network device may send, to the terminal device, the first duration corresponding to the target network device. Further, the source network device may send, to the terminal device by using the same message (namely, the RRC reconfiguration message), the first duration corresponding to the target network device and the random access resource allocated by the target network device to the terminal device, so that transmission resources can be effectively saved.

It should be noted that, for the handover scenario, the manner described in Embodiment 4 may be used, and the source network device sends, to the terminal device, the first duration corresponding to the target network device. Alternatively, the terminal device may adaptively obtain the first duration in the manner in Embodiment 1, Embodiment 2, or Embodiment 3.

Embodiment 5

In Embodiment 5, a possible implementation of the communication method is described based on the foregoing solution 5.

Figure 8:
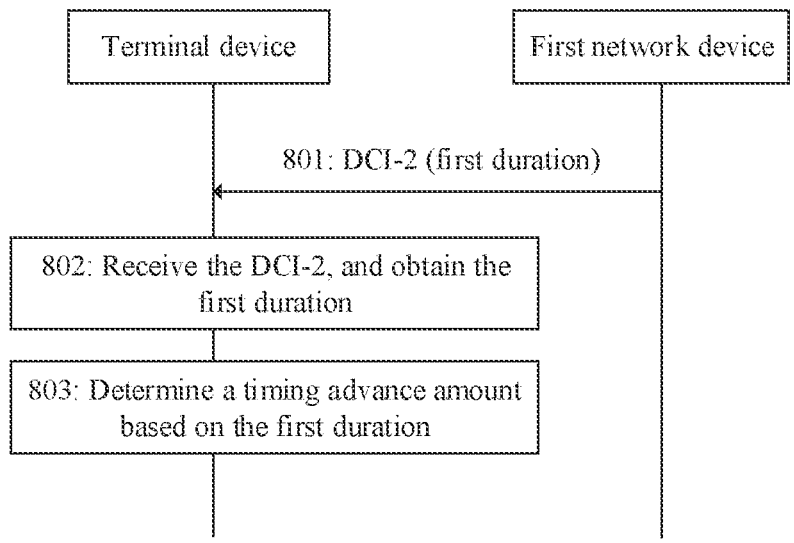
FIG. 8 is a schematic flowchart corresponding to a communication method according to Embodiment 5 of this application.

FIG. 8 is a schematic flowchart corresponding to the communication method according to Embodiment 5 of this application. As shown in FIG. 8, the communication method includes the following steps.

Step 801: A network device sends DCI-2 to a terminal device, where the DCI-2 is used to indicate the terminal device to trigger a random access procedure, and the DCI-2 includes a first duration.

For example, w % ben the DCI-2 indicates the terminal device to trigger the random access procedure, the DCI-2 may be referred to as a PDCCH order.

For example, the DCI-2 may be DCI in a plurality of possible formats, for example, a DCI format 1A.

Step 802: The terminal device receives the DCI-2 and obtains the first duration.

Step 803: The terminal device determines a timing advance amount based on the first duration.

For example, for an implementation of step 803, refer to step 404 in Embodiment 1. Details are not described again.

According to the foregoing method, for the random access procedure triggered by the PDCCH order, the network device may send the first duration to the terminal device by using the PDCCH order, so that the terminal device does not need to read a system message to obtain the first duration, and power consumption of the terminal device is effectively reduced.

For the foregoing Embodiment 1 to Embodiment 5, it should be noted that: (1) Embodiment 1 to Embodiment 5 may be separately implemented in different scenarios, or different embodiments in Embodiment 1 to Embodiment 5 may be adaptively combined for implementation, or solutions in the different embodiments in Embodiment 1 to Embodiment 5 may be adaptively combined for implementation.

(2) The foregoing descriptions focus on a difference between the different embodiments in Embodiment 1 to Embodiment 5. For content other than the difference, Embodiment 1 to Embodiment 5 may be cross-referenced.

(3) Step numbers in the flowcharts described in Embodiment 1 to Embodiment 5 are merely an example of an execution procedure, and do not constitute a limitation on an execution sequence of the steps. In embodiments of this application, there is no strict execution sequence between steps that do not have a time sequence dependency relationship with each other.

(4) In embodiments of this application, that a message A includes information a (or a message A is used to carry information a) may be understood as that the message A includes the information a, or may be understood as that the message A includes information b (for example, an index of the information a) used to indicate the information a.

(5) In the NTN scenario, in addition to the common TA described above, there may be another time parameter that continuously changes as a satellite moves. Therefore, the communication method provided in embodiments of this application is also applicable to the time parameter. To be specific, the common TA in embodiments of this application may be adaptively replaced with the time parameter. Alternatively, the terminal device may obtain the time parameter in a manner the same as that of obtaining the common TA. For example, both the time parameter and the common TA may be carried in the SIB X.

For example, the time parameter may be a parameter related to a distance between the terminal device and the satellite, for example, may be a time offset (offset). For example, if the time parameter is a time offset of a round-trip delay (round-trip delay, RTD), after obtaining the time parameter, the terminal device may update a pre-obtained RTD. For another example, if the time parameter is a time offset of a user plane (user plane, UP) offset (offset)/timer (timer), after obtaining the time parameter, the terminal device may update a pre-obtained UP offset/timer. The pre-obtained RTD or UP offset/timer may be updated based on the time parameter in a plurality of manners. For example, the time parameter is added to the pre-obtained RTD or UP offset/timer, to obtain an updated RTD or UP offset/timer. The time parameter may have a positive or negative value.

For example, the time parameter is the time offset of the UP offset/timer. A time unit of the time parameter may be the same as or different from a time unit of the UP offset/timer. When the time unit of the time parameter is different from the time unit of the UP offset/timer, the terminal device may first adjust the time unit of the time parameter to be consistent with the time unit of the UP offset/timer, and then update the UP offset/timer.

In embodiments of this application, the UP timer may include at least one of the following: a MAC layer timer, an RLC layer timer, or a PDCP layer timer.

The MAC layer timer may include a discontinuous reception (discontinuous reception, DRX)-related timer, a scheduling request (scheduling request, SR)-related timer, a buffer status report (buffer status report, BSR)-related timer, and a random access-related timer.

TABLE 1

Examples of the DRX-related timer

| Name | Description | Value unit |
| --- | --- | --- |
| drx-onDurationTimer | DRX on-duration timer | Millisecond/ms |
| drx-InactivityTimer | DRX inactivity timer | Millisecond/ms |
| drx-HARQ-RTT-TimerDL | Minimum wait duration for downlink hybrid automatic repeat request (hybrid automatic repeat request, HARQ) retransmission scheduling | Symbol/Symbol |
| drx-HARQ-RTT-TimerUL | Minimum wait duration for uplink HARQ retransmission scheduling | Symbol/Symbol |
| drx-RetransmissionTimerDL | Wait time for the DRX-related timer to receive downlink retransmitted data | Slot/slot |
| drx-RetransmissionTimerUL | Wait time for the DRX-related timer to receive uplink retransmission scheduling | Slot/slot |
| drx-LongCycleStartOffset | DRX long periodicity and subframe offset | Millisecond/ms |

TABLE 1-continued

Examples of the DRX-related timer

| Name | Description | Value unit |
| --- | --- | --- |
| drx-ShortCycle | DRX short periodicity | Millisecond/ms |
| drx-ShortCycleTimer | DRX short periodicity timer | Multiple of drx-ShortCycle |
| drx-SlotOffset | DRX slot offset value | 1/32 ms |

Table 2 shows some possible examples of the SR-related timer.

TABLE 2

Examples of the SR-related timer

| Name | Description | Value unit |
| --- | --- | --- |
| sr-ProhibitTimer | SR prohibit timer | Millisecond/ms |
| logicalChannelSR-DelayTimer | Logical channel SR delay timer | Subframe/subframe |

Table 3 shows some possible examples of the BSR-related timer.

TABLE 3

Examples of the SR-related timer

| Name | Description | Value unit |
| --- | --- | --- |
| periodicBSR-Timer | Periodic BSR timer | Subframe/subframe |
| retxBSR-Timer | Retransmission BSR timer | Subframe/subframe |

TABLE 4

Examples of the random access-related timer

| Name | Description | Value unit |
| --- | --- | --- |
| ra-ContentionResolutionTimer | Contention resolution timer | Subframe/subframe |
| ra-ResponseWindow | Random access response window size | Slot/slot |

TABLE 5

Examples of the RLC layer timer

| Name | Description | Value unit |
| --- | --- | --- |
| T-PollRetransmit | Poll retransmission timer | Millisecond/ms |
| T-StatusProhibit | Status report prohibit timer | Millisecond/ms |

TABLE 6

Examples of the PDCP layer timer

| Name | Description | Value unit |
| --- | --- | --- |
| discardTimer | Discard timer | Millisecond/ms |
| t-Reordering | Reordering timer | Millisecond/ms |

It may be understood that the foregoing described UP timer may include some examples of timers. In another possible embodiment, the UP timer may further include another possible timer, for example, a data inactivity timer (DataInactivityTimer) or an uplink time alignment timer (timeAlignmentTimer), which is not listed one by one herein.

The foregoing mainly describes the solutions provided in embodiments of this application from a perspective of interaction between a network device and a terminal device. It may be understood that, to implement the foregoing functions, the network device or the terminal device may include a corresponding hardware structure and/or a software module for performing each function. A person skilled in the art should be easily aware that, in combination with units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional units may be performed on the terminal device and the network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 9:
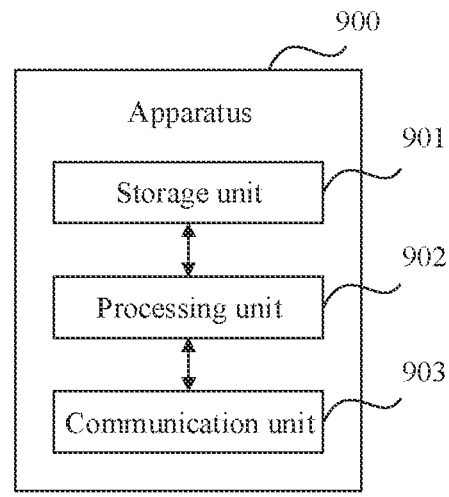
FIG. 9 is a possible schematic block diagram of an apparatus according to an embodiment of this application.

When the integrated unit is used, FIG. 9 is a possible example block diagram of an apparatus according to an embodiment of this application. As shown in FIG. 9, an apparatus 900 may include a processing unit 902 and a communication unit 903. The processing unit 902 is configured to control and manage an action of the apparatus 900. The communication unit 903 is configured to support communication between the apparatus 900 and another device. Optionally, the communication unit 903 is also referred to as a transceiver unit, and may include a receiving unit and/or a sending unit, respectively configured to perform a receiving operation and a sending operation. The apparatus 900 may further include a storage unit 901 that is configured to store program code and/or data of the apparatus 900.

The apparatus 900 may be the terminal device in any one of the foregoing embodiments, or may be a chip disposed in the terminal device. The processing unit 902 may support the apparatus 900 in performing actions of the terminal device in the foregoing method examples. Alternatively, the processing unit 902 mainly performs an internal action of the terminal device in the method examples, and the communication unit 903 may support communication between the apparatus 900 and a network device.

In an embodiment, the processing unit 902 controls the communication unit 903 to: determine that a first duration needs to be obtained, determine the first duration, and determine a timing advance amount based on the first duration, where the timing advance amount is used for communication between the terminal device and a network device.

In a possible design, the processing unit 902 is specifically configured to determine to trigger a random access procedure.

In a possible design, the processing unit 902 is specifically configured to determine that the terminal device does not have a valid first duration.

In a possible design, the communication unit 903 is specifically configured to receive a system message from the network device, where the system message is used to carry a first duration; or the processing unit 902 is specifically configured to determine the first duration based on a first auxiliary parameter, where the first auxiliary parameter includes location information of a ground reference point, or the first auxiliary parameter includes location information of a ground reference point and location information of the network device; or the processing unit 902 is specifically configured to determine the first duration based on a second auxiliary parameter, where the second auxiliary parameter includes an initial value of the first duration, information about a moment corresponding to the initial value, and a change rate of the first duration.

In a possible design, the processing unit 902 is further configured to: obtain a second duration, and determine the timing advance amount based on the first duration and the second duration.

In a possible design, the communication unit 903 is further configured to: receive a random access response from the network device, where the random access response includes the second duration; or receive a random access response from the network device, where the random access response includes a fourth duration; and receive an adjustment value of the fourth duration from the network device, and determine the second duration based on the fourth duration and the adjustment value.

In another embodiment, the processing unit is configured to determine a first change periodicity of a first system message, where the first system message is used to carry a first duration, the first duration is used to determine a first timing advance amount, and the first timing advance amount is used for communication between the terminal device and a first network device; and the communication unit 903 is configured to receive the first system message from the first network device based on the first change periodicity, where the first change periodicity is different from a second change periodicity of a second system message, and the second system message is from the first network device.

In a possible design, the communication unit 903 is specifically configured to:
receive first indication information from the first network device, % where the first indication information is used to indicate that the first system message changes; and
receive an updated first system message in the first change periodicity in which the first indication information is located.

In a possible design, the first system message is further used to carry a third duration, the third duration is used to determine a second timing advance amount, and the second timing advance amount is used for communication between the terminal device and a second network device.

In a possible design, the communication unit 903 is specifically configured to:
receive second indication information from the first network device, where the second indication information is used to indicate that the first duration changes, or is used to indicate that the third duration changes; and
receive the first system message in the first change periodicity in which the second indication information is located.

The apparatus 900 may be the network device in any one of the foregoing embodiments, or may be a chip disposed in the network device. The processing unit 902 may support the apparatus 900 in performing actions of the network device in the foregoing method examples. Alternatively, the processing unit 902 mainly performs an internal action of the network device in the method examples, and the communication unit 903 may support communication between the apparatus 900 and a terminal device.

In an embodiment, the processing unit 902 is configured to determine an auxiliary parameter, where the auxiliary parameter includes a location of a ground reference point, or the auxiliary parameter includes a location of a ground reference point and a location of the network device, or the auxiliary parameter includes an initial value of a first duration, information about a moment corresponding to the initial value, and a change rate of the first duration; and
the communication unit 903 is configured to send the auxiliary parameter to the terminal device.

In a possible design, the communication unit 903 is further configured to send a satellite ephemeris to the terminal device, where the network device is located on a satellite, or the satellite is a relay node for communication between the terminal device and the network device.

In another embodiment, the processing unit 902 is configured to determine a first change periodicity of a first system message, where the first system message is used to carry a first duration, the first duration is used to determine a first timing advance amount, and the first timing advance amount is used for communication between the terminal device and the apparatus; and the communication unit 903 is configured to send third indication information to the terminal device, where the third indication information is used to indicate the first change periodicity, the first change periodicity is different from a second change periodicity of a second system message, and the second system message is from the apparatus.

In a possible design, the communication unit 903 is further configured to send first indication information to the terminal device, where the first indication information is used to indicate that the first system message changes.

In a possible design, the first system message is further used to carry a third duration, the third duration is used to determine a second timing advance amount, and the second timing advance amount is used for communication between the terminal device and a second network device.

In a possible design, the communication unit 903 is further configured to send second indication information to the terminal device, where the second indication information is used to indicate that the first duration changes, or is used to indicate that the third duration changes.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing method, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, when the unit in the apparatus is implemented by scheduling a program by a processing element, the processing element may be a processor, for example, a central processing unit (central processing unit, CPU) or another processor that can invoke the program. For still another example, the units may be integrated and implemented in a form of a system-on-a-chip (system-on-a-chip, SOC).

The foregoing receiving unit is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a manner of a chip, the sending unit is an interface circuit that is of the chip and that is configured to send a signal from another chip or apparatus.

Figure 10:
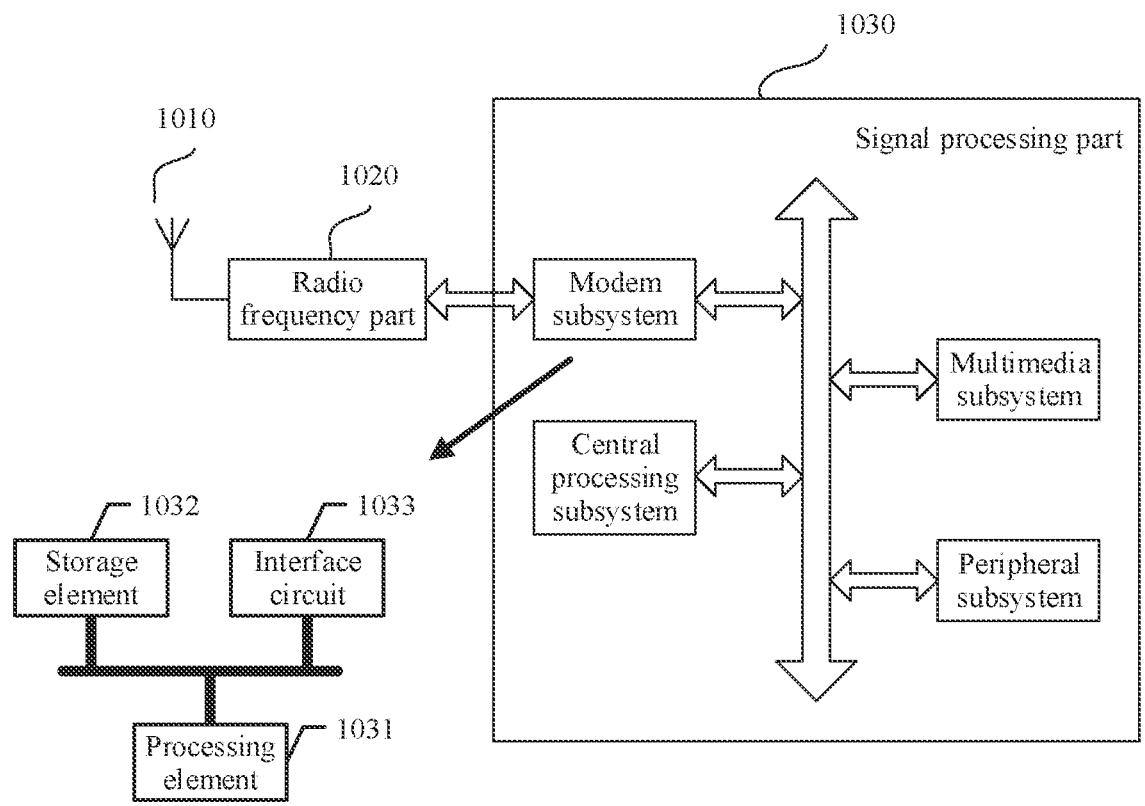
FIG. 10 is a schematic diagram of a structure of a terminal device according to an embodiment of this application.

FIG. 10 is a schematic diagram of a structure of a terminal device according to an embodiment of this application. The terminal device may be the terminal device in the foregoing embodiments, and may be configured to implement operations of the terminal device in the foregoing embodiments. As shown in FIG. 10, the terminal device includes an antenna 1010, a radio frequency part 1020, and a signal processing part 1030. The antenna 1010 is connected to the radio frequency part 1020. In a downlink direction, the radio frequency part 1020 receives, by using the antenna 1010, information sent by a network device; and sends, to the signal processing part 1030 for processing, the information sent by the network device. In an uplink direction, the signal processing part 1030 processes the information of the terminal, and sends the processed information to the radio frequency part 1020; and the radio frequency part 1020 processes the information of the terminal device, and then sends the processed information to the network device by using the antenna 1010.

The signal processing part 1030 may include a modem subsystem, configured to process data at each communication protocol layer. The signal processing part 1030 may further include a central processing subsystem, configured to process an operating system and an application layer that are of the terminal device. In addition, the signal processing part 1030 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a chip that is separately disposed.

The modem subsystem may include one or more processing elements 1031, for example, include a main control CPU and another integrated circuit. In addition, the modem subsystem may further include a storage element 1032 and an interface circuit 1033. The storage element 1032 is configured to store data and a program. However, a program used to perform the methods performed by the terminal device in the foregoing methods may not be stored in the storage element 1032, but is stored in a memory outside the modem subsystem, and is loaded and used by the modem subsystem when to be used. The interface circuit 1033 is configured to communicate with another subsystem.

The modem subsystem may be implemented by a chip. The chip includes at least one processing element and an interface circuit. The processing element is configured to perform the steps of any method performed by the foregoing terminal device. The interface circuit is configured to communicate with another apparatus. In an implementation, units in the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. These integrated circuits may be integrated together to form a chip.

Units of the terminal device that implement the steps in the foregoing methods may be integrated together, and implemented in a form of an SOC. The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods that are provided in the foregoing method embodiments and performed by the terminal device. The processing element may perform, in a first manner, to be specific, by invoking the program stored in the storage element, some or all steps performed by the terminal device; or may perform, in a second manner, to be specific, by using a hardware integrated logic circuit in the processor element in combination with instructions, some or all steps performed by the terminal device, or may certainly perform, by combining the first manner and the second manner, some or all steps performed by the terminal device.

The processing element herein is the same as that described above, and may be implemented by using a processor. A function of the processing element may be the same as a function of the processing unit described in FIG. 9. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented by using a memory. A function of the storage element may be the same as a function of the storage unit described in FIG. 9. The storage element may be implemented by using a memory. A function of the storage element may be the same as a function of the storage unit described in FIG. 9. The storage element may be one memory, or an umbrella term of a plurality of memories.

The terminal device shown in FIG. 10 can implement the processes related to the terminal device in the method embodiments shown in FIG. 4a, FIG. 5, FIG. 6a, FIG. 7, or FIG. 8. Operations and/or functions of the modules in the terminal device shown in FIG. 10 are intended to implement the corresponding procedures in the foregoing method embodiments. For details, refer to the descriptions in the foregoing method embodiments. To avoid repetition, detailed descriptions are properly omitted herein.

Figure 11:
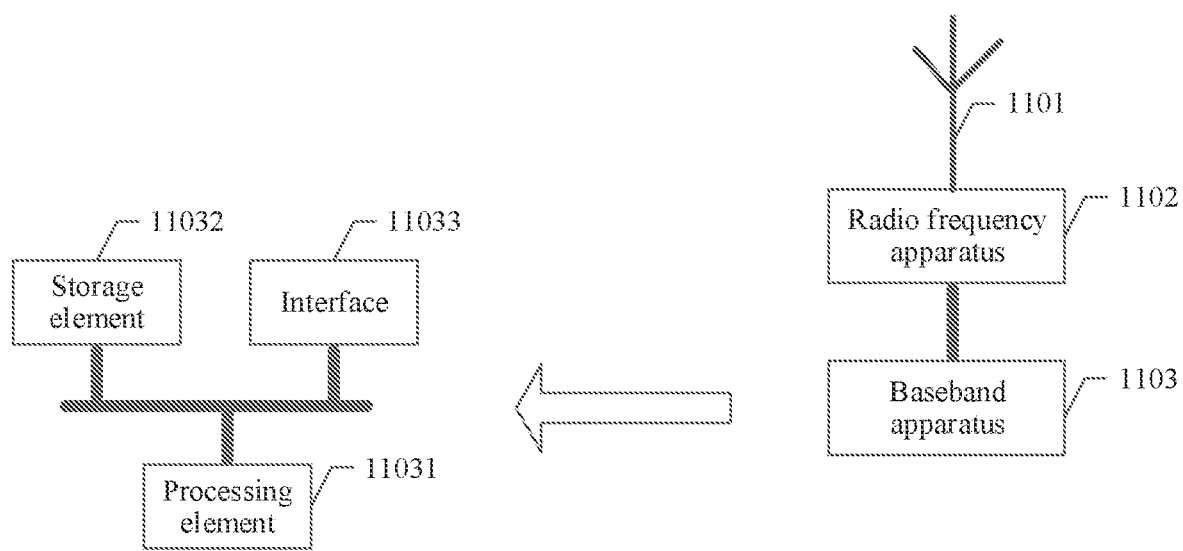
FIG. 11 is a schematic diagram of a structure of a network device according to an embodiment of this application.

FIG. 11 is a schematic diagram of a structure of a network device according to an embodiment of this application. The network device is configured to implement the operations of the network device in the foregoing embodiments. As shown in FIG. 11, the network device includes an antenna 1101, a radio frequency apparatus 1102, and a baseband apparatus 1103. The antenna 1101 is connected to the radio frequency apparatus 1102. In an uplink direction, the radio frequency apparatus 1102 receives, by using the antenna 1101, information sent by a terminal device; and sends, to the baseband apparatus 1103 for processing, the information sent by the terminal device. In a downlink direction, the baseband apparatus 1103 processes information from the terminal device and sends processed information to the radio frequency apparatus 1102, and the radio frequency apparatus 1102 processes the information from the terminal device and then sends processed information to the terminal device by using the antenna 1101.

The baseband apparatus 1103 may include one or more processing elements 11031, for example, include one main control CPU and another integrated circuit. In addition, the baseband apparatus 1103 may further include a storage element 11032 and an interface 11033. The storage element 11032 is configured to store a program and data. The interface 11033 is configured to exchange information with the radio frequency apparatus 1102. The interface is, for example, a common public radio interface (common public radio interface, CPRI). The foregoing apparatus applied to the network device may be located in the baseband apparatus 1103. For example, the foregoing apparatus applied to the network device may be a chip in the baseband apparatus 1103. The chip includes at least one processing element and an interface circuit. The processing element is configured to perform steps in any method performed by the network device. The interface circuit is configured to communicate with another apparatus. In an implementation, units in the network device for implementing the steps in the foregoing methods may be implemented in a form of scheduling a program by the processing element. For example, the apparatus used in the network device includes a processing element and a storage element. The processing element invokes a program stored in the storage element, to perform the method performed by the network device in the foregoing method embodiments. The storage element may be a storage element on the same chip as the processing element, that is, an on-chip storage element; or may be a storage element that is on a different chip from the processing element, that is, an off-chip storage element.

In another implementation, units of the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. These integrated circuits may be integrated together to form a chip.

The units in the network device for implementing the steps in the foregoing methods may be integrated together, and implemented in a form of a system-on-a-chip (system-on-a-chip, SOC). For example, the baseband apparatus includes the SOC chip, and is configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with instructions; or may certainly perform, by combining the first manner and the second manner, some or all steps performed by the network device.

The processing element herein is the same as that described above, and may be implemented by using a processor. A function of the processing element may be the same as a function of the processing unit described in FIG. 9. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented by using a memory. A function of the storage element may be the same as a function of the storage unit described in FIG. 9. The storage element may be implemented by using a memory. A function of the storage element may be the same as a function of the storage unit described in FIG. 9. The storage element may be one memory, or an umbrella term of a plurality of memories.

The network device shown in FIG. 11 can implement the processes related to the network device in the method embodiments shown in FIG. 4a, FIG. 5, FIG. 6a, FIG. 7, or FIG. 8. Operations and/or functions of the modules in the network device shown in FIG. 11 are intended to implement the corresponding procedures in the foregoing method embodiments. For details, refer to the descriptions in the foregoing method embodiments. To avoid repetition, detailed descriptions are properly omitted herein.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In an implementation process, the steps of the methods in the embodiments may be performed by using a hardware integrated logic circuit in the processor, or by using instructions in a form of software. The steps of the methods disclosed with reference to embodiments of this application may be directly performed and completed by a hardware processor, or may be performed and completed by a combination of hardware and software modules in the processor.

It should be noted that the memory or storage unit in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM) and is used as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include, but not limited to, these memories and any memory of another proper type.

All or some of the foregoing embodiments may be implemented by using software, hardware, firmware, or any combination thereof. When the software is used for implementation, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (solid state disk, SSD).

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may be integrated into a processor. The processor and the storage medium may be disposed in the ASIC, and the ASIC may be disposed in a terminal device. Optionally, the processor and the storage medium may alternatively be arranged in different components of the terminal device.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although embodiments of this application are described with reference to specific features, it is clearly that various modifications and combinations may be made to embodiments of this application without departing from the spirit and scope of embodiments of this application. Correspondingly, the specification and accompanying drawings are merely example descriptions of embodiments of this application that are defined by the appended claims, and are considered to cover any or all of modifications, variations, combinations, or equivalents in the scope of embodiments of this application.

What is claimed is:

1. A communication method, wherein the method comprises:
   determining, by a terminal device based on an auxiliary parameter, a first duration associated with location information of a satellite, wherein the auxiliary parameter comprises an initial value of the first duration, information about a moment corresponding to the initial value, and a change rate of the first duration; and
   determining, by the terminal device, a timing advance (TA) amount based on the first duration, wherein the TA amount is used for communication between the terminal device and a network device using the satellite.

2. The method according to claim 1, wherein the method further comprises:
   determining to trigger a random access procedure.

3. The method according to claim 1, wherein the method further comprises:
   determining that the terminal device does not have a valid first duration.

4. The method according to claim 2, wherein a trigger reason of the random access procedure does not comprise requesting a system message or beam failure recovery.

5. The method according to claim 1, wherein the method further comprises:
   receiving a system message from the network device, wherein the system message is used to carry the first duration.

6. The method according to claim 5, wherein the method further comprises:
   receiving the auxiliary parameter from the network device.

7. The method according to claim 5, wherein the first duration is determined based on the auxiliary parameter and a satellite ephemeris, wherein the satellite ephemeris is from the network device or a core network device, or the satellite ephemeris is preconfigured, and wherein the network device is located on the satellite, or the satellite is a relay node for communication between the terminal device and the network device.

8. The method according to claim 1, wherein determining the TA amount based on the first duration comprises:
   obtaining a second duration; and
   determining the TA amount based on the first duration and the second duration.

9. The method according to claim 8, wherein obtaining the second duration comprises:
   receiving a random access response from the network device, wherein the random access response comprises the second duration; or
   receiving a random access response from the network device, wherein the random access response comprises a fourth duration, receiving an adjustment value of the fourth duration from the network device, and determining the second duration based on the fourth duration and the adjustment value.

10. A communication method, wherein the method comprises:
    determining, by a network device, an auxiliary parameter, wherein the auxiliary parameter comprises an initial value of a first duration associated with location information of a satellite, information about a moment corresponding to the initial value, and a change rate of the first duration; and
    sending, by the network device, the auxiliary parameter to a terminal device using the satellite, wherein the auxiliary parameter is used by the terminal device to determine the first duration.

11. The method according to claim 10, wherein sending the auxiliary parameter to the terminal device comprises:
    sending a system message to the terminal device, wherein the auxiliary parameter is carried in the system message.

12. The method according to claim 10, wherein the method further comprises:
    sending a satellite ephemeris to the terminal device, wherein the network device is located on the satellite, or the satellite is a relay node for communication between the terminal device and the network device.

13. An apparatus, comprising:
    one or more processors; and
    one or more memories coupled to the one or more processors and storing programming instructions for execution by the one or more processors to cause the apparatus to perform operations comprising:
      determining, based on an auxiliary parameter, a first duration associated with location information of a satellite, wherein the auxiliary parameter comprises an initial value of the first duration, information about a moment corresponding to the initial value, and a change rate of the first duration; and
      determining a timing advance (TA) amount based on the first duration, wherein the TA amount is used for communication between the apparatus and a network device using the satellite.

14. The apparatus according to claim 13, wherein the operations further comprise:
    determining to trigger a random access procedure.

15. The apparatus according to claim 13, wherein the operations further comprise:
    determining that the apparatus does not have a valid first duration.

16. The apparatus according to claim 14, wherein a trigger reason of the random access procedure does not comprise requesting a system message or beam failure recovery.

17. The apparatus according to claim 13, wherein the operations further comprise:
    receiving a system message from the network device, wherein the system message is used to carry the first duration.

18. The apparatus according to claim 17, wherein the operations further comprise:
    receiving the auxiliary parameter from the network device.

19. The apparatus according to claim 17, wherein the first duration is determined based on the auxiliary parameter and a satellite ephemeris, wherein the satellite ephemeris is from the network device or a core network device, or the satellite ephemeris is preconfigured, and wherein the network device is located on the satellite, or the satellite is a relay node for communication between the apparatus and the network device.

20. The apparatus according to claim 13, wherein determining the TA amount based on the first duration comprises:
   obtaining a second duration; and
   determining the TA amount based on the first duration and the second duration.

21. An apparatus, comprising:
   one or more processors; and
   one or more memories coupled to the one or more processors and storing programming instructions for execution by the one or more processors to cause the apparatus to perform operations comprising:
      determining an auxiliary parameter, wherein the auxiliary parameter comprises an initial value of a first duration associated with location information of a satellite, information about a moment corresponding to the initial value, and a change rate of the first duration; and
      sending the auxiliary parameter to a terminal device using the satellite, wherein the auxiliary parameter is used by the terminal device to determine the first duration.

* * * * *